United States Patent [19]

Dillon et al.

[11] Patent Number: 5,076,375
[45] Date of Patent: * Dec. 31, 1991

[54] LOAD CELL

[75] Inventors: Benny N. Dillon, Worthington; Neil C. Griffen, Westerville; Mark E. Weihs, Toledo, all of Ohio

[73] Assignee: Mettler-Toledo, Inc., Worthington, Ohio

[*] Notice: The portion of the term of this patent subsequent to Mar. 28, 2006 has been disclaimed.

[21] Appl. No.: 523,253

[22] Filed: May 14, 1990

Related U.S. Application Data

[60] Continuation of Ser. No. 272,830, Nov. 18, 1988, abandoned, which is a division of Ser. No. 126,272, Nov. 30, 1987, Pat. No. 4,815,547.

[51] Int. Cl.$^5$ .................. G01G 23/18; G01L 1/22
[52] U.S. Cl. ................... 177/45; 177/25.19; 73/862.65
[58] Field of Search .................. 177/45, 25, 19; 73/862.65, 862.67

[56] References Cited

U.S. PATENT DOCUMENTS

| | | |
|---|---|---|
| 2,962,276 | 2/1964 | Thurston . |
| 3,164,014 | 1/1965 | Redner . |
| 3,460,382 | 8/1969 | Schultheis, Jr. . |
| 3,621,927 | 3/1970 | Ormond . |
| 3,736,998 | 5/1973 | Flinth et al. . |
| 3,997,014 | 12/1976 | Soderhelm et al. . |
| 4,162,628 | 6/1979 | Detjen et al. . |
| 4,248,317 | 2/1981 | Rahav . |
| 4,483,404 | 1/1984 | Weihs . |
| 4,589,291 | 5/1986 | Sander I ............... 73/862.65 |
| 4,619,147 | 10/1986 | Yoshimura et al. ......... 73/862.65 X |
| 4,728,922 | 3/1988 | Christen et al. ............. 177/136 X |
| 4,738,324 | 4/1988 | Borchard ................. 177/25.14 |
| 4,804,053 | 2/1989 | Nordstrom .................. 177/211 |
| 4,872,349 | 10/1989 | Espiritu-Santo . |

FOREIGN PATENT DOCUMENTS

| | | |
|---|---|---|
| 2234025 | 1/1974 | Fed. Rep. of Germany ... 73/862.65 |
| 8030920 | 1/1982 | Fed. Rep. of Germany . |
| 3042086 | 6/1982 | Fed. Rep. of Germany ...... 177/255 |
| 3103015 | 12/1982 | Fed. Rep. of Germany . |
| 3405127 | 9/1985 | Fed. Rep. of Germany . |
| 0366116 | 3/1974 | Sweden . |
| 2162322 | 1/1986 | United Kingdom ............. 73/862.65 |

Primary Examiner—George H. Miller, Jr.

[57] ABSTRACT

A digital load cell includes a rocker pin, guided beam torsion ring or other counterforce, a circuit board mounted on the counterforce and an enclosure sealing the circuit board and all but the load bearing surfaces of the counterforce. The circuit board includes an A/D converter and a micrcomputer. Digital communication is provided with the circuit board through a connector mounted on the enclosure. Weight data are corrected digitally. The load cell may be calibrated, characterized, controlled and monitored digitally through the connector from a remote location without physically penetrating the enclosure. One or a number of digital load cells may be connected to a computer or controller to form one or more weighing scales.

5 Claims, 17 Drawing Sheets

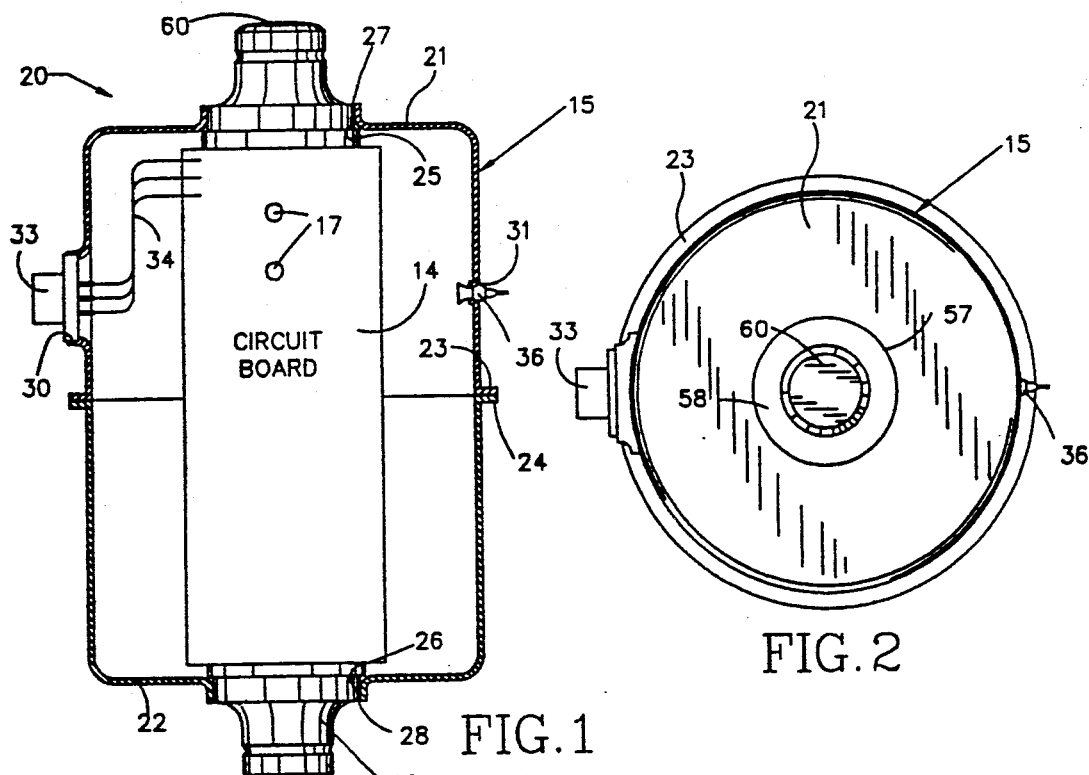
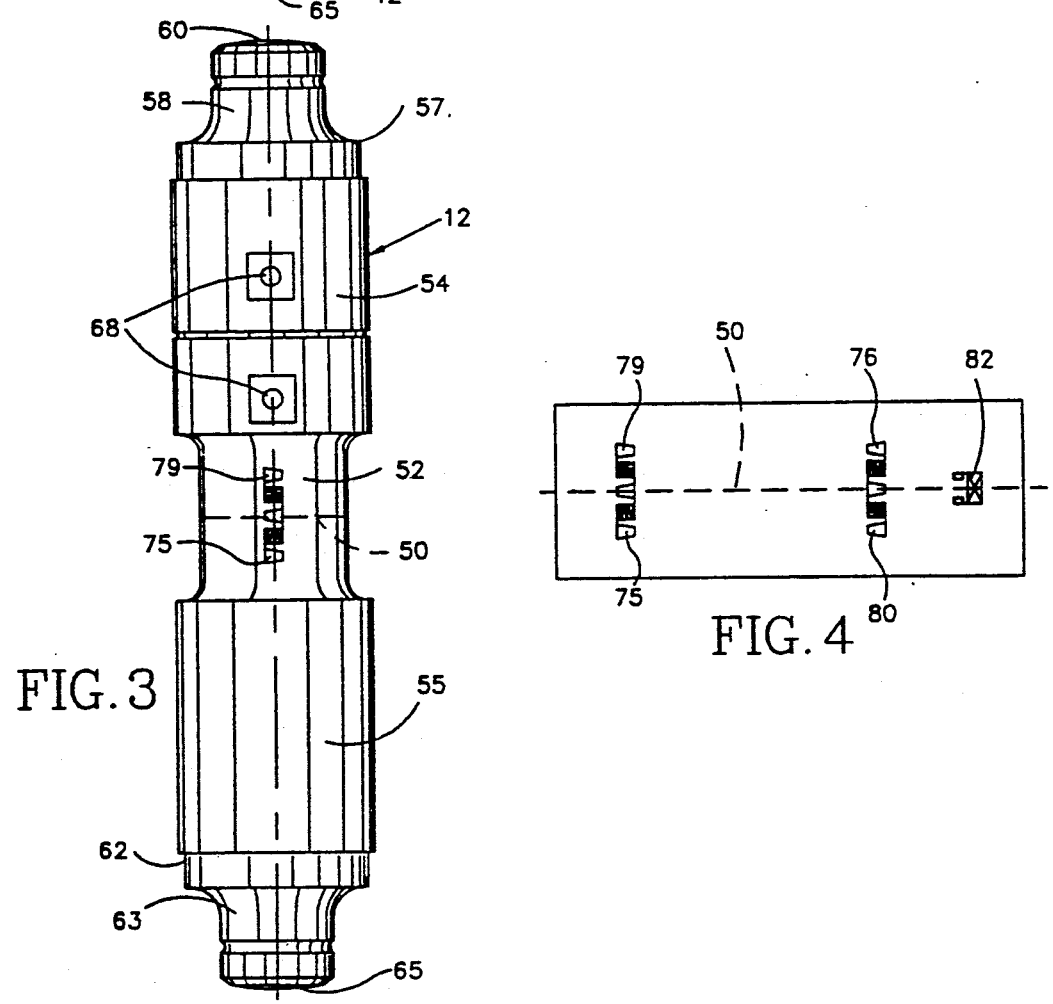

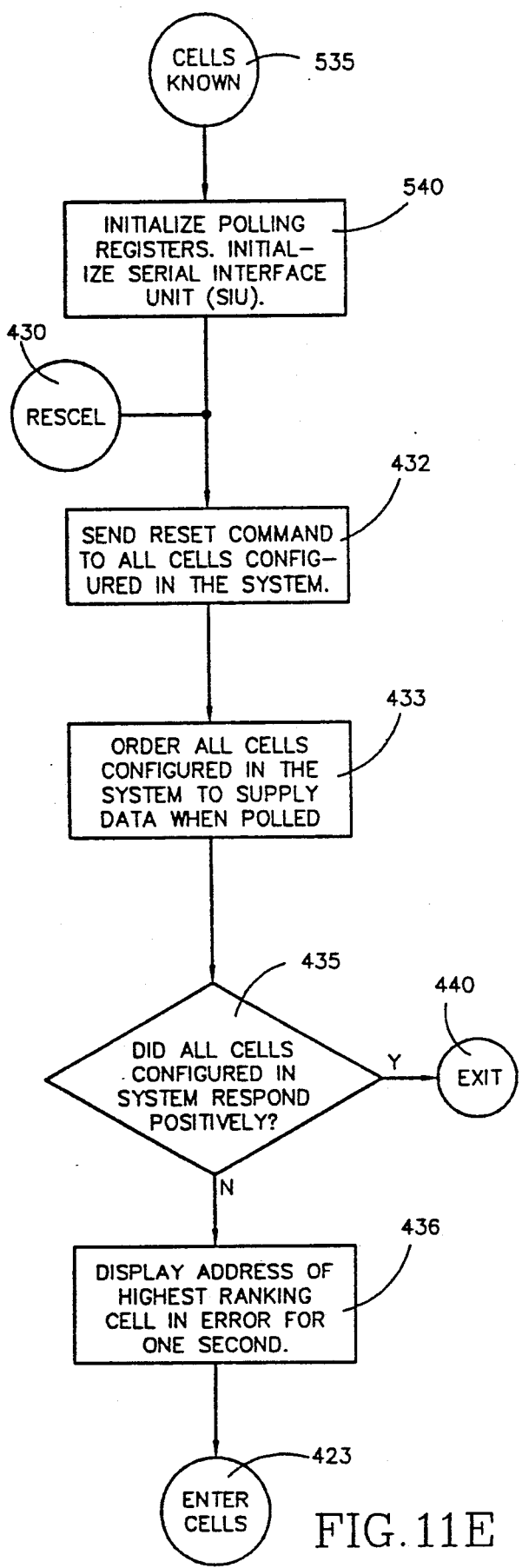
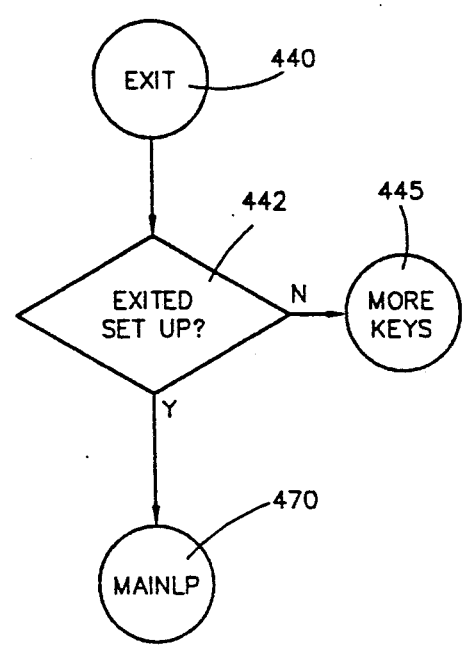
FIG.11F
FIG.11E

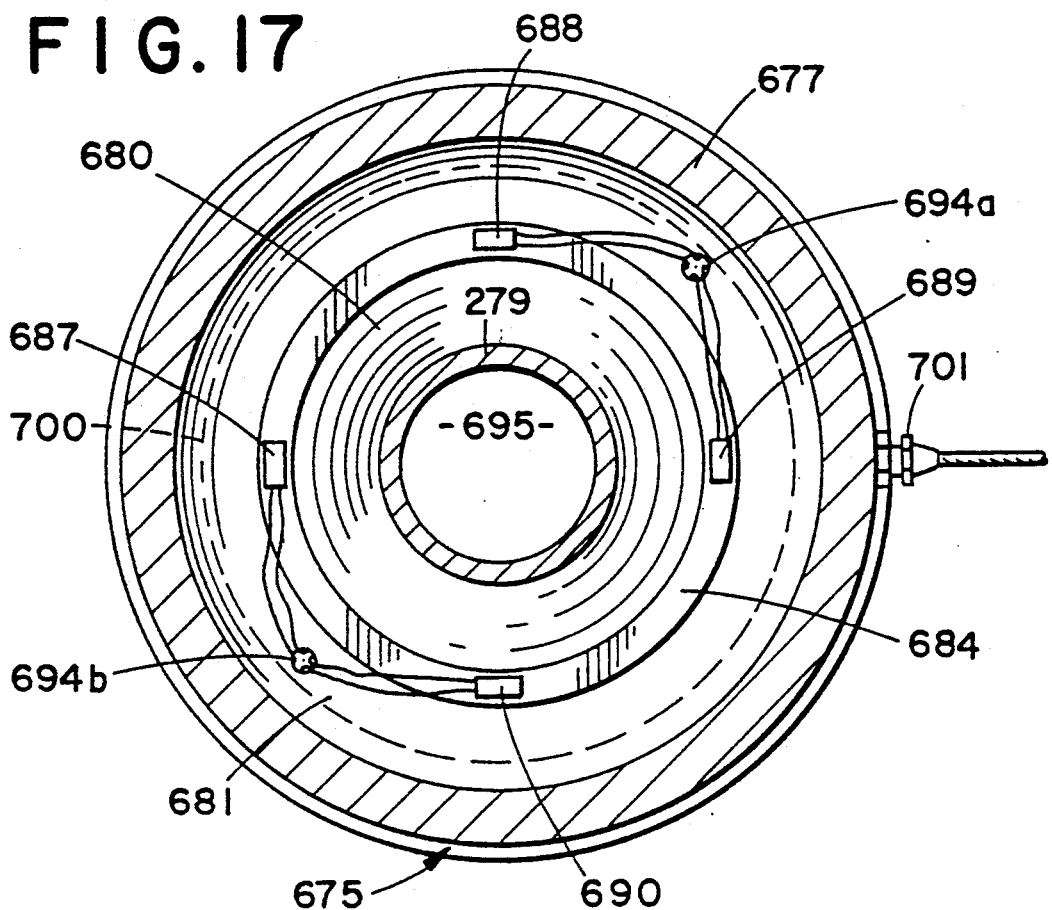
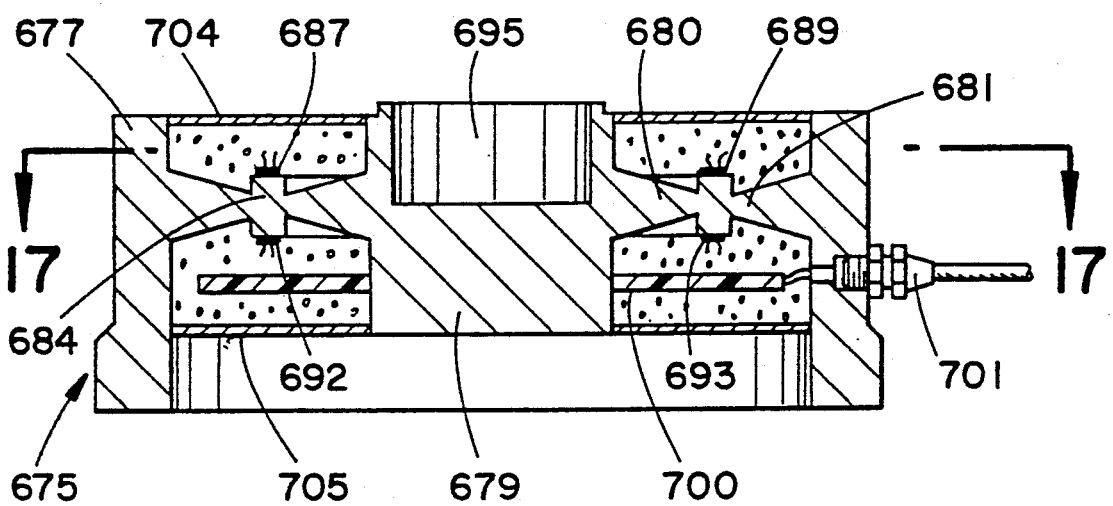

LOAD CELL

This application is a continuation of application Ser. No. 272,830, filed 11-18-88, which is a division of Ser. No. 126,272, filed 11-30-87, now U.S. Pat. No. 4,815,547.

BACKGROUND OF THE INVENTION

This invention relates to weighing apparatus and more particularly to a modular "smart" digital load cell and the use of a rocker pin as a counterforce.

The so-called "rocker pin" is a column with curved end surfaces and has been used in weighing applications for a number of years, usually as a load transmitting device A principal advantage of the rocker pin is that it can be made self-erecting, that is, so that when the normally upright pin is deflected about its base or grounded end the pin will return to its upright position when the deflecting load is removed. The self-erecting feature is an advantage in weighing applications in which temporary side loads are encountered. The self-erecting feature is obtained by configuring the pin so that the radius of curvature of each end surface is greater than half the total height of the pin. The rocker pin is also simple to manufacture in that all shaping required is circular and can be accomplished by turning the pin on a lathe. No drilling, tapping or machining is required. The pin is, therefore, inexpensive to manufacture.

Columnar structures have been provided with strain gages or similar transducers and employed as counterforces in weighing applications. The performance of the column in this respect has not been entirely satisfactory, however, primarily because of nonlinearity problems The column when loaded yields unequal tensile and compressive strain which produces a nonlinear strain characteristic as compared to counterforces which yield nearly equal tensile and compressive strains. Some linearity correction has been obtained by addition of a semiconductor strain gauge in series with the input voltage to the strain gauge bridge which varies the voltage of the bridge in such a way as to compensate for the nonlinearity. Nonlinearity remains, however, a substantial disadvantage of the columnar load cell.

Recently there has appeared the so-called "digital load cell" in which an analog-to-digital converter and microprocessor are dedicated to a single load cell. The electronic circuits are mounted on a printed circuit board connected directly to the counterforce This development has permitted digital correction of various load cell inaccuracies.

SUMMARY OF THE INVENTION

An object of this invention is to provide a load cell utilizing the rocker pin as a counterforce. Another object is to overcome the disadvantages previously associated with columnar load cells. Still another object is to provide a digital load cell that is modular and requires no physical adjustment after manufacture and is sealed to permit and require only digital analysis and correction from an external source.

Weighing apparatus according to one aspect of the present invention includes a rocker pin counterforce in the form of a monolithic column having a curved loading surface at each end. The radius of curvature of each loading surface is greater than one half the height of the column Transducer means is mounted on the periphery of the column for producing signals representing loads applied to the end surfaces.

In a further aspect of the invention means are associated with the counterforce for providing a digital representation of a load on the counterforce Means are provided for storing a linearity correction factor for the counterforce along with means for combining the digital representation with the linearity correction factor to provide a corrected digital representation of the load on the counterforce.

According to another aspect of the invention, a load cell having a digital circuit board fastened to the counterforce is provided with a sealed enclosure for the circuit board and the transducer bearing portion of the counterforce. Means such as a connector provides a signal path through the enclosure to the circuit board for external communication. The circuit board includes circuits for producing digital weight readings and transmitting them over the path through the enclosure as well as means for applying stored digital correction factors to the weight readings The load cell requires no physical adjustment within the enclosure after manufacture and can be controlled and corrected using the signal path through the enclosure. A number of such modular load cells in one or more scales can be connected to a common controller and together in a local area network.

The counterforce may be a rocker pin and predetermined linearity correction factors may be stored and applied to the weight readings.

BRIEF DESCRIPTION OF THE DRAWINGS

FIG. 1 is a vertical sectional view of a digital load cell employing a rocker pin counterforce according to the present invention;

FIG. 2 is a top plan view of the load cell of FIG. 1;

FIG. 3 is a front view of a rocker pin counterforce;

FIG. 4 is a developed view of the reduced diameter section of the counterforce of FIG. 3 showing the arrangement of strain gauges thereon;

FIG. 9A to 9M are a flow chart illustrating the operation of each digital load cell in the present invention;

FIGS. 11A to 11L are a flow chart illustrating the operation of the master controller of FIG. 8.

FIG. 16 is a vertical sectional view of still another modular digital load cell embodying this invention; and FIG. 17 is a horizontal sectional view of the load cell of FIG. 16 on line 17—17.

BEST MODE FOR CARRYING OUT THE INVENTION

Figure 5:
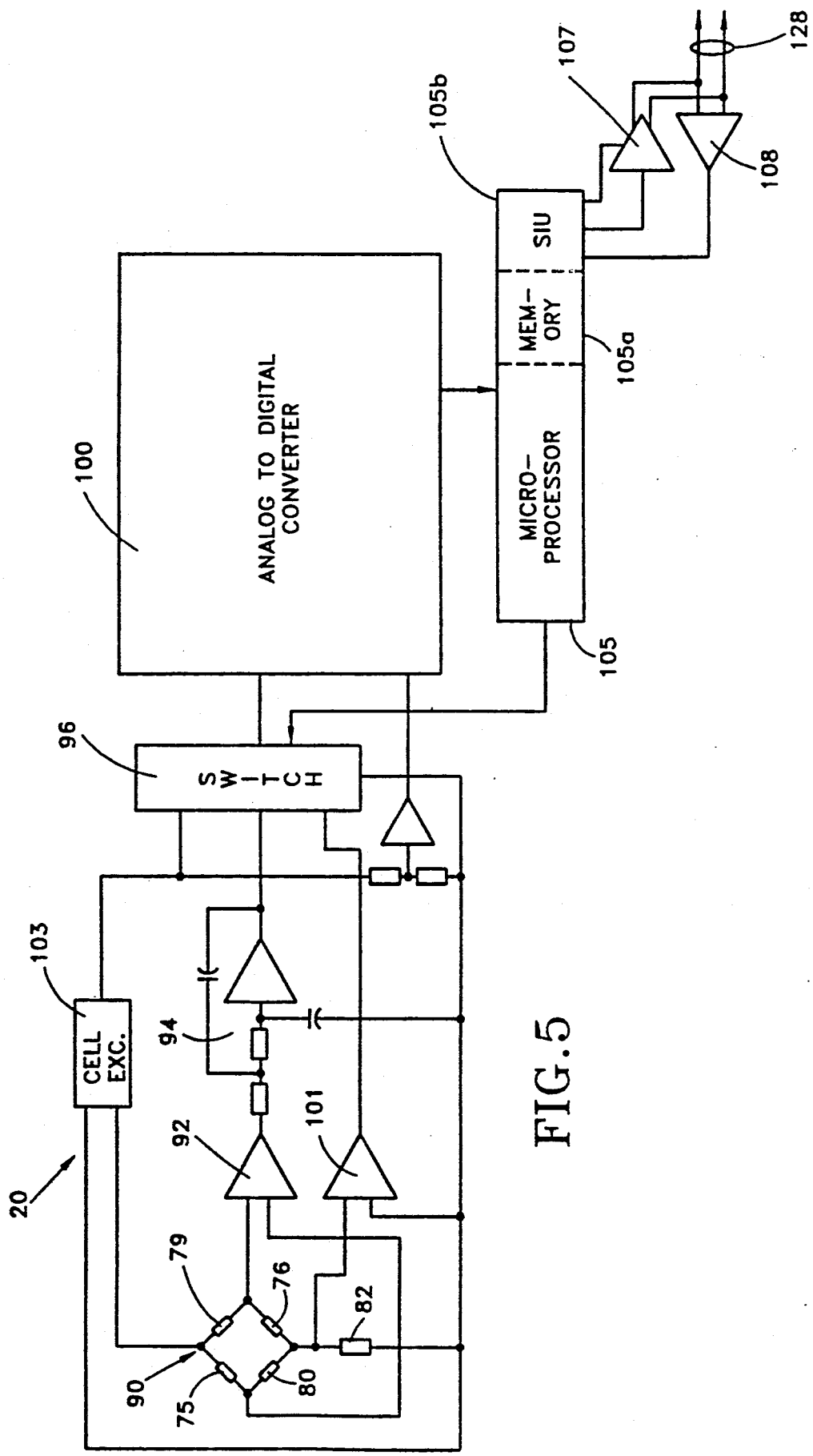
FIG. 5 is a block diagram of the electronic circuit of the digital load cell.

Referring initially to FIGS. 1 to 4, a load cell embodying the present invention includes a rocker pin counterforce 12 of stainless steel or the like A printed circuit board 14 is attached to the counterforce and an enclosure generally designated 15 encloses the board and most of the counterforce Printed circuit board 14 contains the electronic circuits associated with the load cell including an analog-to-digital converter and a microprocessor and is described more fully below. Printed circuit board 14 is secured to counterforce 12 by screws 17 extending through spacers into the body of the counterforce The combination of counterforce, circuit board and enclosure produces the digital load cell generally designated 20.

Enclosure 15 is generally cylindrical and includes upper and lower bowl-like members 21 and 22, respectively, both preferably of stainless steel. Each member 21, 22 has at its open end a flange 23, 24, respectively, extending radially outwardly from the rim of the member. The flanges 23, 24 are welded together to join the upper and lower members Central openings 25, 26 are provided in the closed ends of members 21, 22 through which extend the outer end portions of counterforce 12. Each member 21, 22 is welded at the periphery of openings 25, 26 to a shoulder on counterforce 12 as shown at 27, 28. Upper member 21 is provided with a pair of radial openings 30 and 31. An electrical connector 33 extends through opening 30 and is welded to the wall portion of member 21 that defines opening 30. Electrical wiring 34 from connector 33 extends within enclosure 15 to a connector on circuit board 14. A vent tube 36 extends through opening 31 and is fixed in place by brazing to the wall of member 21. Vent tube 36 allows the interior of enclosure 15 to be purged and then sealed from the external atmosphere by blocking the vent tube.

Referring now to FIGS. 3 and 4, rocker pin counterforce 12 has the overall form of a cylindrical column symmetrical lengthwise about a transverse center line 50. A portion of a reduced diameter section 52 extends in each direction from center line 50 to merge with an upper body section 54 and a lower body section 55 An upper shoulder 57, to which upper enclosure member 21 is welded, extends from body section 54 to an upper neck 58 which terminates in an upper loading surface 60. Correspondingly, a lower shoulder 62, to which lower enclosure member 22 is welded, extends from body section 55 to a lower neck 63 which terminates in a lower loading surface 65. Each loading surface 60, 65 has a radius of curvature greater than one-half the total height of the rocker pin in order to make the pin self-erecting, that is, so that when supported on one loading surface 60, 65 it will return to an upright position when a force deflecting it from that position is removed. A pair of tapped holes 68 are provided in upper body section 54 for receipt of screws 17 to attach circuit board 14 to the counterforce. Counterforce 12 may be formed in a very cost-efficient manner from a right circular cylindrical rod or bar turned on a lathe with, except for holes 68, no requirement for drilling, tapping or other machining.

Reduced diameter section 52 on the counterforce provides a desired range of strain in that section when the rocker pin is under rated loads. A set of strain gauges and a temperature sensing resistor are arranged as shown in FIG. 4 on the periphery of reduced section 52. A pair of compression sensing strain gauges 75, 76 are mounted at diametrically opposite locations on reduced section 52 below and above, respectively, center line 50 with their strain sensing elements oriented lengthwise of the rocker pin to sense compressive strain produced by loads applied to loading surfaces 60, 65. A pair of tension sensitive strain gauges 79, 80 are mounted at the same diametrically opposite locations as compression gauges 75, 76 but on opposite sides of center line 50 from the compression gauges. The strain sensing elements of gauges 79 and 80 are generally aligned with transverse center line 50 to sense tensile strains manifested by an increase in the circumference of reduced section 52 when loading surfaces 60, 65 are loaded in compression. A temperature sensitive nickel resistor 82 is mounted on reduced section 52 midway between the two vertically aligned sets of strain gauges and aligned with transverse center line 50.

The load cell of FIGS. 1 to 4 is assembled by first connecting printed circuit board 14 to counterforce 12 by means of screws 17 and connection of wiring between the counterforce and the printed circuit board. Connector 33 and vent tube 36 are welded or brazed to upper enclosure member 21. The counterforce and circuit board are fitted to upper enclosure member 21 and wiring connections made between the circuit board and connector 33. Upper member 21 is welded to shoulder 57 on counterforce 12 as shown at 27 Lower enclosure member 22 is then fitted to upper member 21 and the two welded together at flanges 23, 24. Lower member 22 is then welded to shoulder 62 on counterforce 12 as indicated at 28. The assembly is then purged through vent tube 36 and the vent tube is crimped and welded closed to hermetically seal the electronic circuits and the non load-contacting portions of counterforce 12 within enclosure 15. The result is a hermetically sealed, self-contained digital load cell which can and must be adjusted, compensated and further characterized only through connector 33 which connects the load cell to a computer or other controller. Accordingly, all analysis, corrections and adjustments can be made from a remote location without physical intervention with the load cell. This permits the load cell to be a modular, interchangeable building block in a weighing system.

The rocker pin counterforce 12 with strain gages or other transducers mounted thereon may, of course, be used as a load cell without a digital circuit board attached and/or being enclosed with the board. Likewise, other forms of counterforce may be used to form the modular digital load cells.

In use, a load is applied to loading surfaces 60 and 65 which produces primarily compression strains parallel to the longitudinal axis of the rocker pin sensed by strain gages 75 and 76. Considerably less tensile strain is produced as radial expansion of reduced section 52. The tensile strain is sensed by gauges 79 and 80. Because the compressive strains are significantly larger than the tensile strains the output of the bridge circuit formed by strain gauges 75, 76, 79 and 80 is substantially nonlinear. As mentioned above, this has been a significant disadvantage in the past in the use of columnar load cells.

Referring now to FIG. 5, the electrical circuit of the digital load cell 20 of FIGS. 1 to 4 includes strain gauges 75, 76, 79 and 80 connected in the electrical brige circuit 90. The bridge circuit provides an analog weight signal to a preamplifier 92. The weight signal from preamplifier 92 is coupled through an analog filter 94 to one input of an analog switch 96. The output of switch 96 is connected to the input of a multiple slope integrating analog-to-digital (A/D) converter 100. Nickel resistor 82 is connected in series with bridge circuit 90 and provides a signal through a preamplifier 101 to another input of analog switch 96. Excitation is provided to bridge circuit 90 by a power supply 103 which also provides a known reference voltage through analog switch 96 to multiple slope A/D 100. The output of A/D converter 100 is connected to a microprocessor 105, preferably an Intel 8344. Microprocessor 105 controls the operation of analog switch 96 to cause analog weight signals from bridge 90 and temperature indicating signals from nickel resistor 82 to be converted to digital form by A/D converter 100 and transmitted to microprocessor 105.

Microprocessor 105 is provided with memory 105a including ROM, EEPROM and RAM for storage of programs and of data received from A/D converter 100 and from a remote controller or computer Microprocessor 105 is also equipped with a serial interface unit 105b connected through a driver 107 and a receiver 108 to a bus or the like for communication with a controller or computer.

Figure 6:
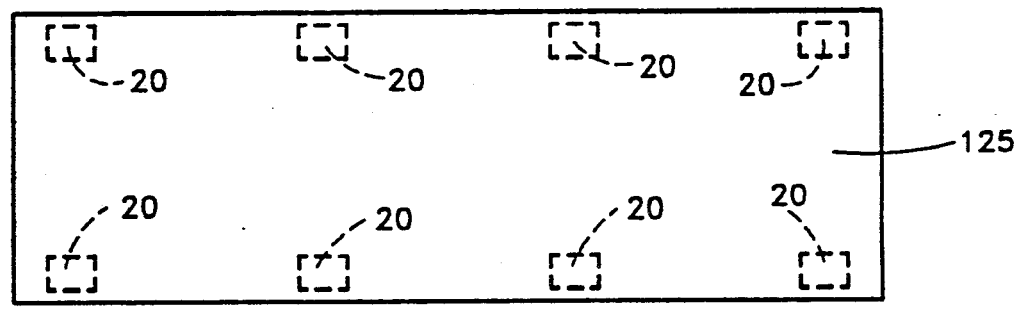
FIG. 6 is a plan view of a vehicle scale utilizing digital load cells.
Figure 7:
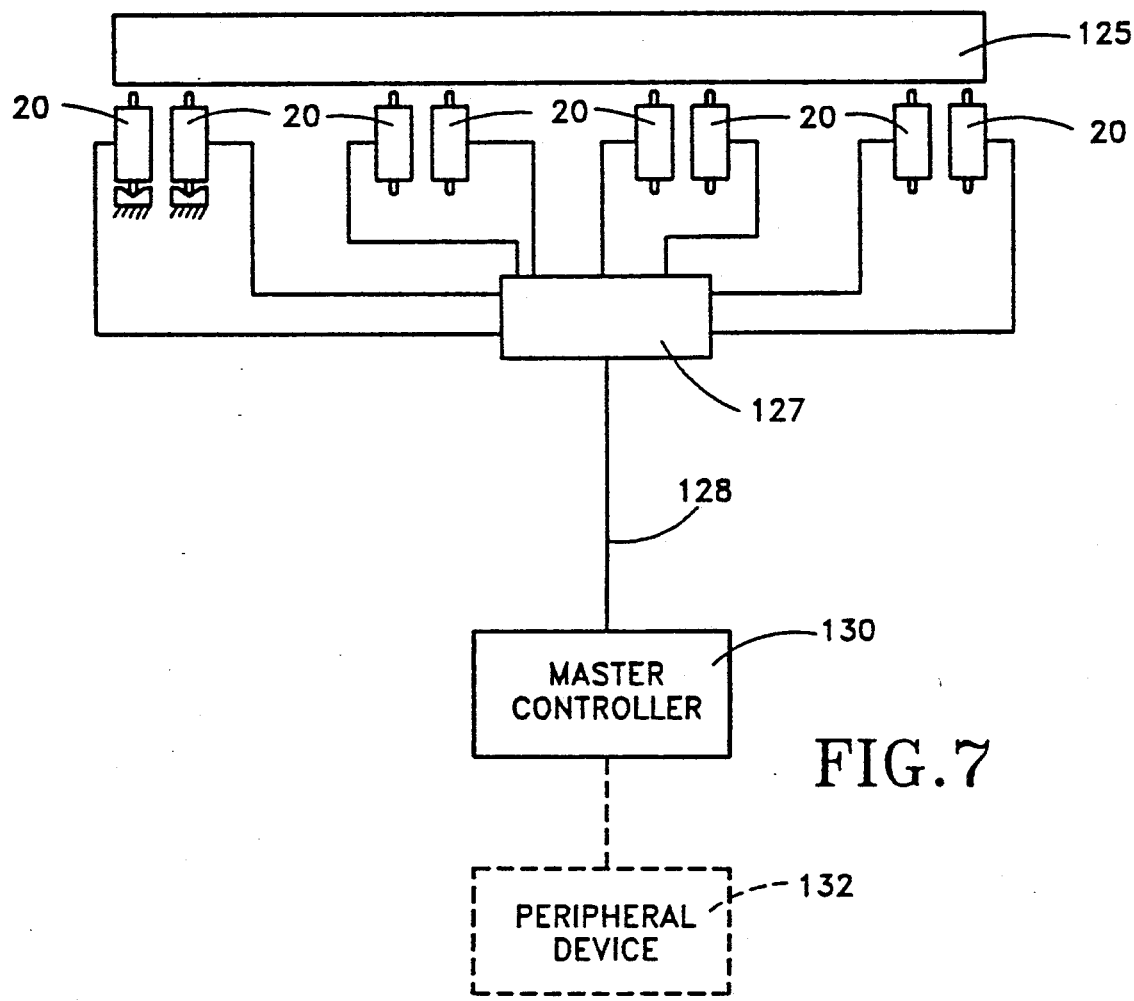
FIG. 7 is a diagram illustrating the connection of the major components of the vehicle scale of FIG. 6.

Referring to FIGS. 6 and 7, there is shown a scale for weighing vehicles using multiple digital load cells. The system includes eight digital load cells 20 as described above supporting a platform 125 suitable for holding a vehicle such as a truck. The load cells 20 are connected together through a junction box 127 and through a bus 128 to a master controller 130. The master controller may be connected to one or more peripheral devices 132 such as a printer or host computer. The digital load cells 20 and master controller 130 are arranged and programmed to constitute a LAN (local area network) with master controller 130 performing as the master and the load cells 20 as slaves. The LAN preferably utilizes the Intel BITBUS communication system.

Figure 8:
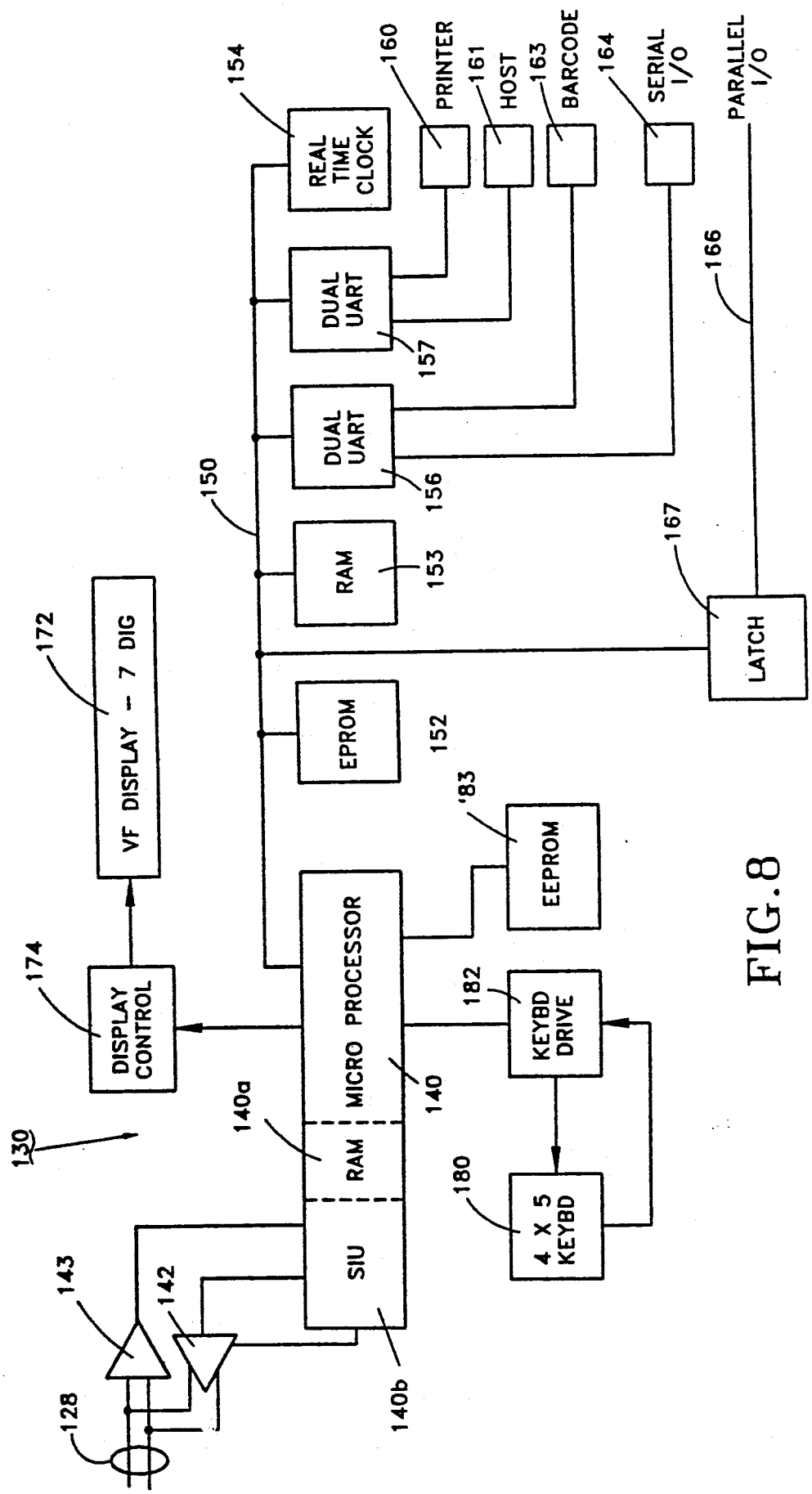
FIG. 8 is a block diagram of a preferred form of master controller used in the scale of FIGS. 6 and 7.

As shown in FIG. 8, master controller 130 includes a microprocessor 140, preferably an Intel 8344, provided with internal RAM memory 140a and a serial interface unit 140b. Microprocessor 140 is connected to bus 128 for communication with the digital load cells 20 through driver 142 and receiver 143 connected to serial interface unit 140b. Microprocessor 140 also communicates with an address/data bus 150 to which is connected a program memory 152, RAM 153, real time clock 154 and a pair of dual transmitters 156, 157 Transmitters 156 and 157 connect bus 150 to various peripheral devices such as a printer 160, host computer 161, bar code encoder 163 and a serial input/output line 164. A parallel input/output line 166 is also connected to bus 150 through a latch 167.

Microprocessor 140 provides weight data to a seven digit vacuum fluorescent display 172 through a display control 174. A keyboard 180 is connected to microprocessor 140 through a keyboard drive 182 for manual selection and inputting of various modes and options during calibration and set up of the system and for making slight changes in operation of the system. A nonvolatile programmable memory 183 is also connected to microprocessor 140 for the storage of various calibration constants and similar information determined during calibration and set up of the system.

The master controller shown in FIG. 8 is manufactured and sold by Toledo Scale Corporation, assignee of the present application, as a Model 8530 Digital Indicator.

In operation of the system of FIGS. 6 and 7, the master controller, acting as a LAN master, polls the load cells, LAN satellites or slaves, at a desired rate to receive weight data from each load cell. The data from each load cell may be operated on in certain respects, summed with the data from other load cells of the scale and the result further operated on to produce the final displayed weight.

Although connection and operation as a LAN is preferred, the digital output of each load cell, or group of load cells sharing an A/D converter, could be connected individually to the master controller rather than through a common bus. The essential feature is that the master controller receive and operate on digital information from each of the multiple load cells.

The digital load cells illustrated in FIGS. 1 to 5 are programmed to operate as slaves to a master controller or host computer and to respond to commands directed to it. The load cell may act alone with a controller or as one load cell in a multiple load cell scale or system with a common or master controller. Each load cell has a unique address stored in memory which, in the latter case, allows the master controller to send commands to it only. All load cells are provided during manufacture with the same address which, if necessary, is replaced with a unique address during set up of the scale.

The digital load cell is also programmed to compensate its weight readings for temperature effects on zero and span, for span trim and for linearity and creep. The compensation algorithms employed including the values of the constants are stored in the load cell memory. The values of the constants are determined during manufacture of the load cell. The constants are determined by connecting the load cell to a host computer during manufacture, subjecting the load cell to the varying weights and temperature conditions required to provide data for use in the corrective algorithms and using the data to solve for the respective constants. The constants are then transmitted by the host computer to the load cell and stored in memory.

A suitable algorithm for use in correcting linearity is:

$$W_C = D \cdot W_R(1 + W_R \cdot E) \qquad (1)$$

where $W_C$ is the weight corrected for linearity, $W_R$ is the uncorrected weight reading, and D and E are constants The values of the constants are determined by taking weight readings at half load and full load and inserting the values into the equation. If $W_{C1}$ and $W_{R1}$ are the values at half load and $W_{C2}$ and $W_{R2}$ are the values at full load and $W_{C2}$ is set equal to $W_{R2}$, then $$D = \frac{1}{1 + E \cdot W_{R2}}$$

and $$E = \frac{W_{R1} - W_{C1}}{W_{C1} \cdot W_{R2} - W_{R1}^2}$$

The values of the constants D and E in these equations are then transmitted to the load cell for use in linearity corrections during operation.

Figure 9A:
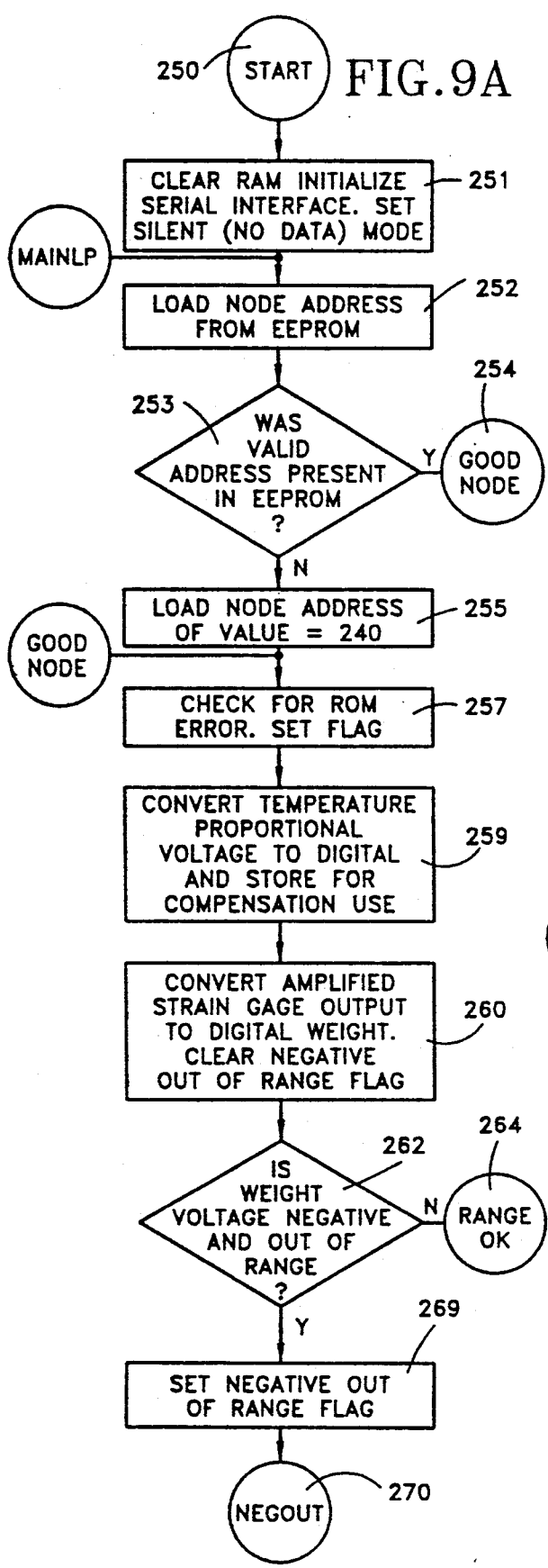
Figure 9B:
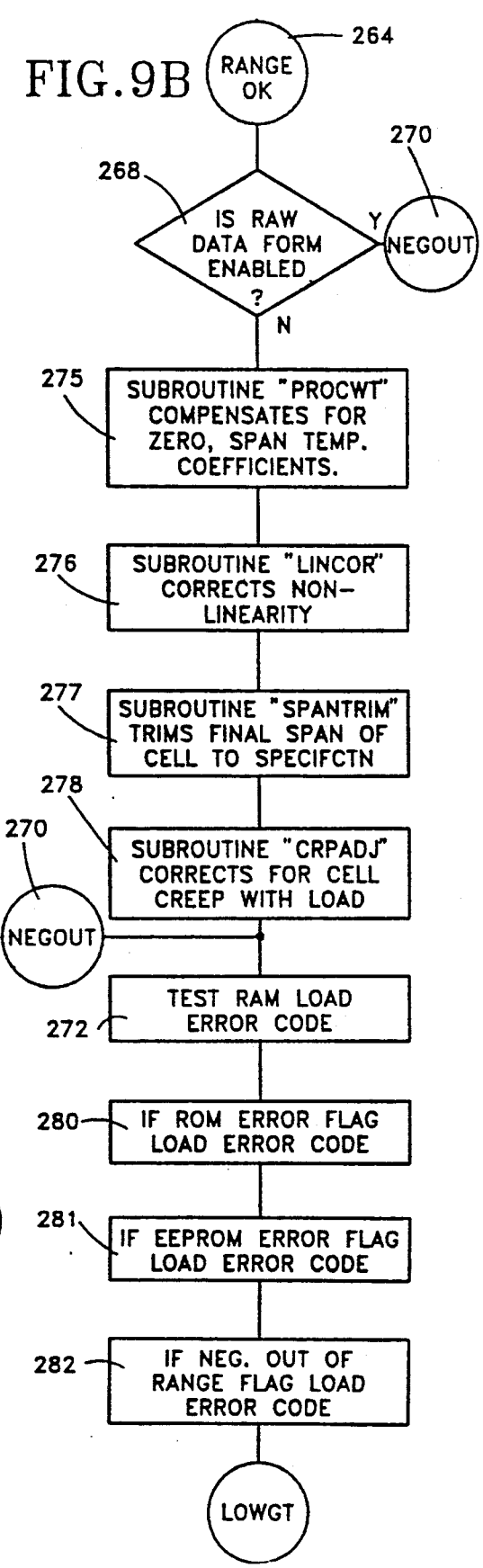
Figure 9C:
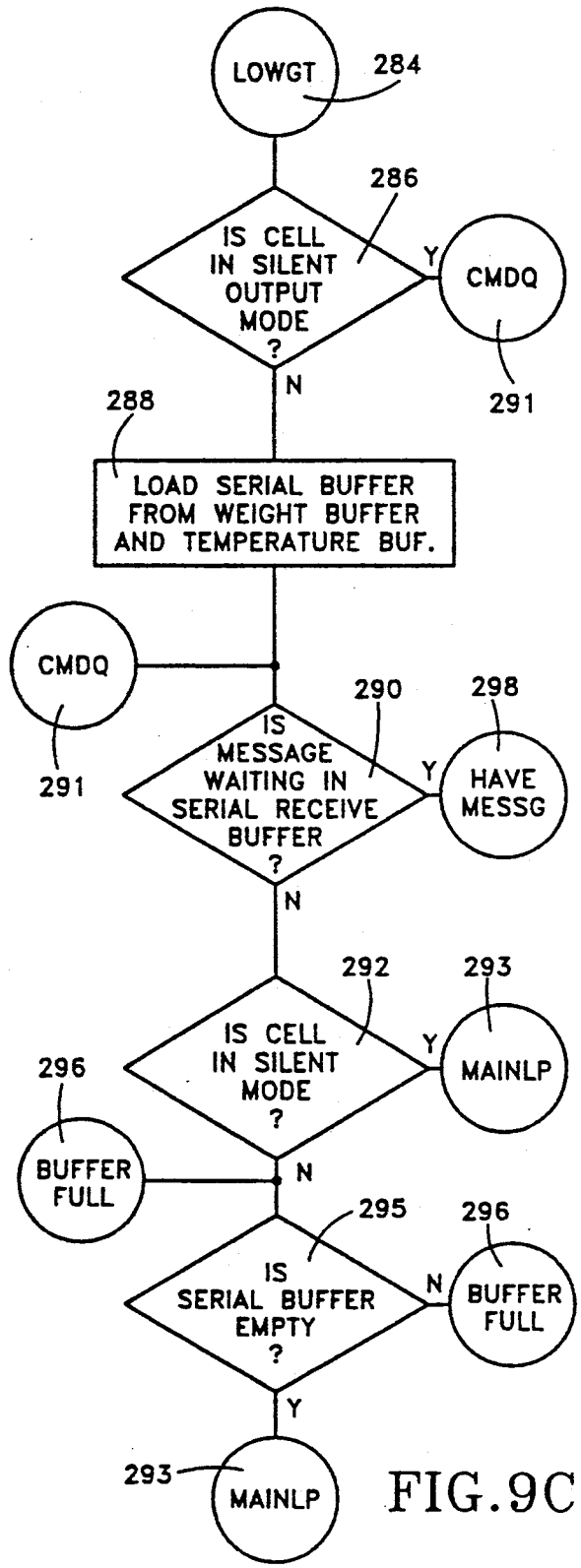
Figure 9D:
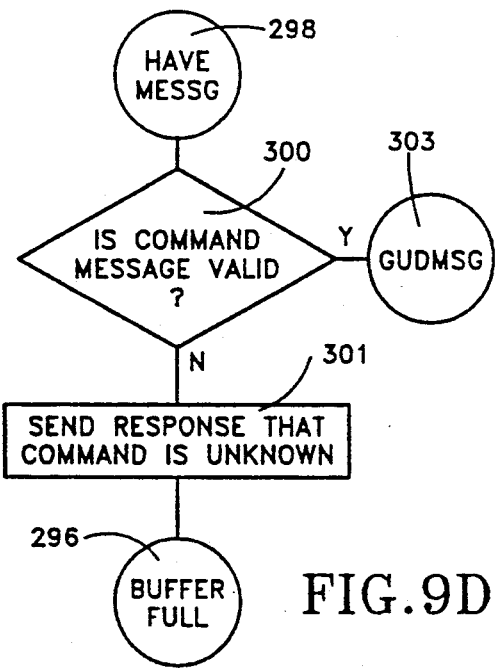
Figure 9E:
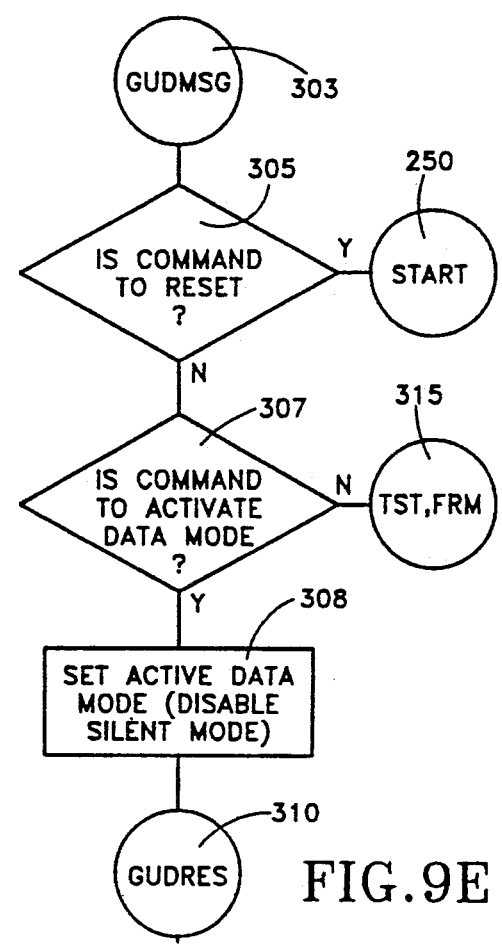
Figure 9F:
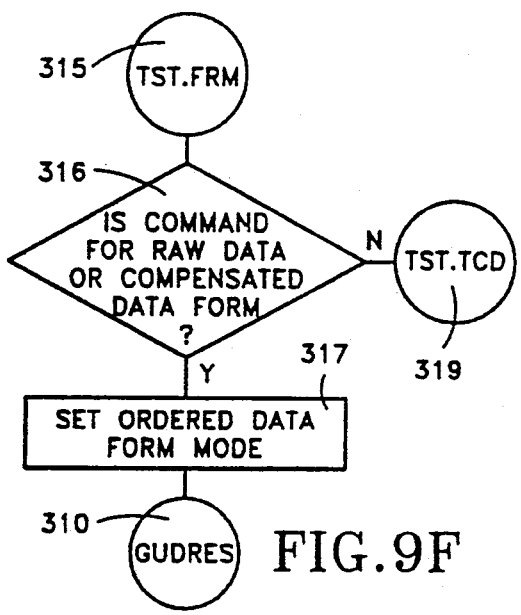
Figure 9H:
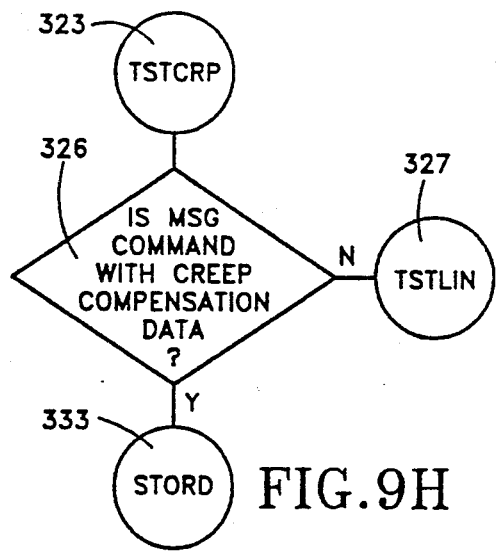
Figure 9G:
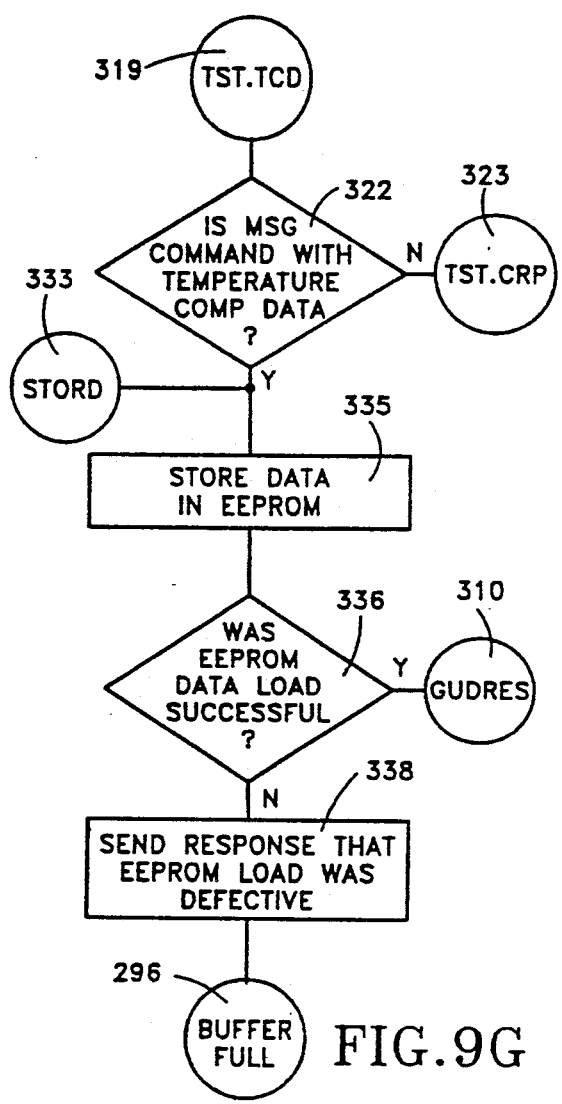
Figure 9J:
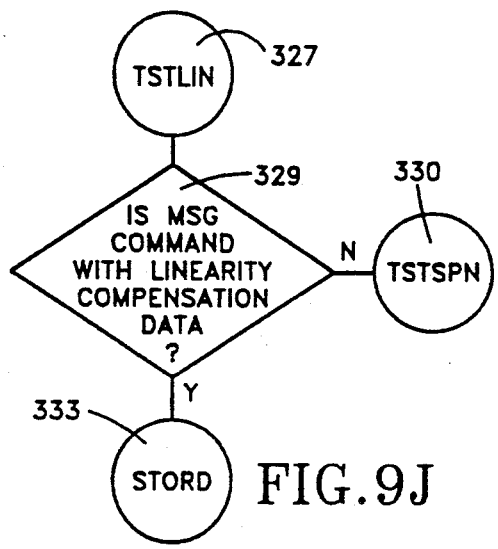
Figure 9K:
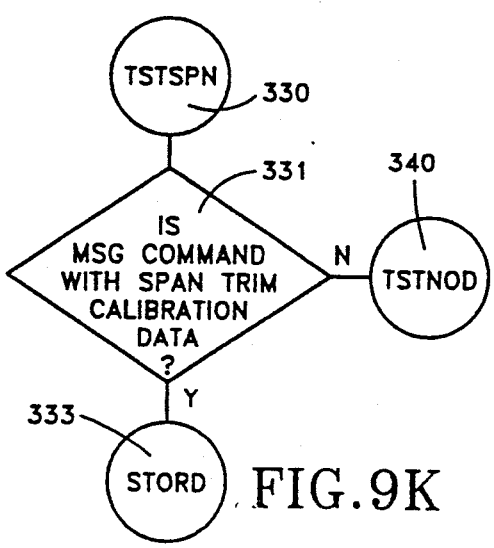
Figure 9L:
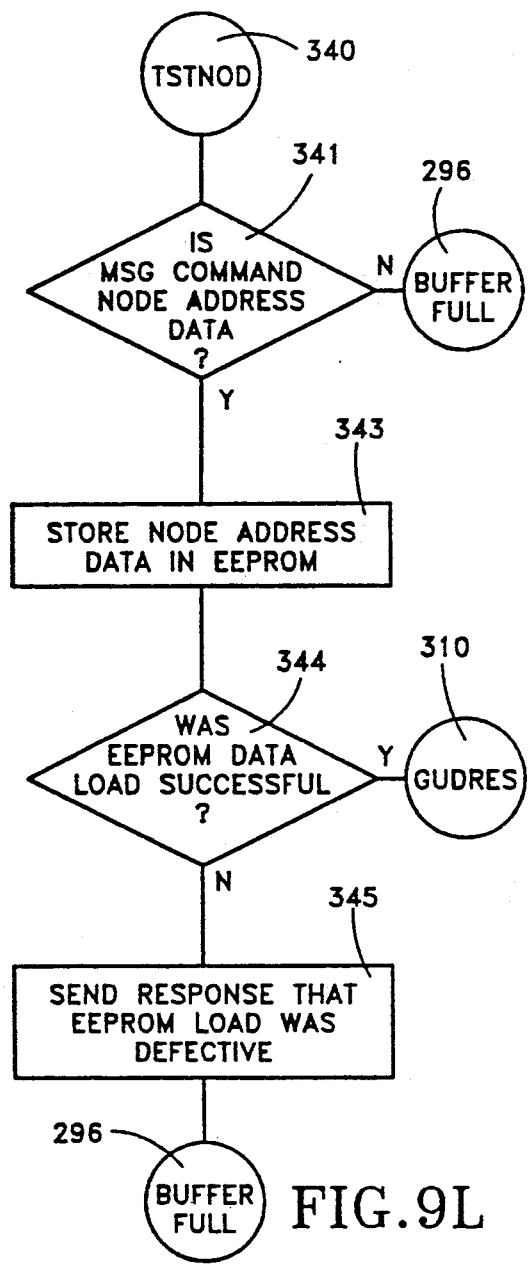
Figure 9M:
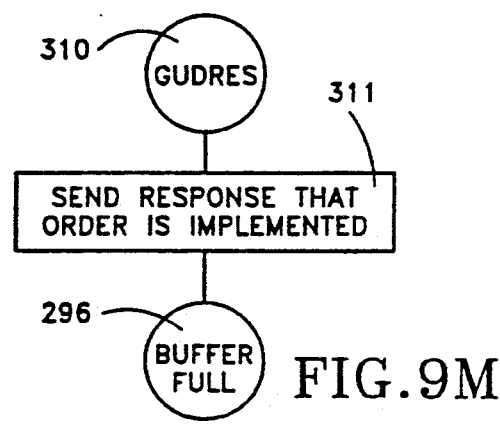

The flow chart of FIGS. 9A to 9M illustrates the operation of the digital load cell, whether connected in a single or multiple load cell system and in calibration or normal operation. After START at block 250 operation is begun in the "silent" mode at block 251. This is essentially a local mode in that the controller or host computer has not yet initiated communication with the load cell. At blocks 252 and 253 the load cell address is taken from memory and checked for validity. If the stored address was invalid an address of arbitrary value, for example, 1 or 240, is loaded at block 255. After the stored address has been determined to be valid or a new one assigned, operation proceeds directly or through point 254 to block 257 where a check is made for ROM errors and a flag is set if any such errors are found. Then, at block 259 a temperature reading is obtained from nickel resistor 82 in FIG. 5 and stored for compensation use At block 260 a digital weight reading is taken and a negative out-of-range flag cleared The weight reading is checked at block 262 to determine whether or not it is out of range. If not, operation proceeds through point 264 to block 268 (FIG. 9B) where a determination is made as to whether the data should be compensated or presented in its raw form. If, at block 262, the weight reading is determined to be out-of-range a flag is set at block 269 and operation proceeds through point 270 to block 272 (FIG. 9B). Likewise, if the weight reading is not to be compensated as determined at block 268 operation jumps through points 270 to block 272.

If the weight reading is to be compensated a subroutine is performed at block 275 to temperature compensate the zero and span coefficients. At block 276 a subroutine "LINCOR" is utilized to correct the weight reading for nonlinearity as will be described below. Subroutines are performed at blocks 277 and 278, respectively, to modify the weight reading according to a span trim coefficient and to correct the weight reading for creep in the load cell.

At blocks 272, 280, 281 and 282 memory errors and out-of-range data are investigated and an appropriate error code loaded if any of the conditions are found. Operation then proceeds through point 284 to block 286 (FIG. 9C) where it is determined whether or not the load cell is in the silent mode If not, the weight and temperature readings are loaded at block 288 into a serial buffer for transmission and operation proceeds to block 290. If the load cell is in silent mode block 288 is bypassed through point 291 to block 290 where a check is made for any messages received from a host computer or controller. If there are no messages and the cell is in silent mode as determined at block 292, operation returns through point 293 to the main loop at block 252 and the operation described above is repeated. If the load cell is not in the silent mode operation proceeds from block 292 to block 295 and cycles through point 296 until the serial buffer is empty, indicating that the weight and temperature readings have been transmitted to the controller or host computer. At that time operation returns through point 293 to the main loop at block 252 (FIG. 9A).

When a message has been received as determined at block 290, operation proceeds through point 298 to block 300 (FIG. 9D) where the validity of the message is determined If the message is not valid, a response to that effect is sent at block 301 and operation returns through point 296 to block 295. If the message is valid, as determined at block 300, operation proceeds through point 303 to block 305 (FIG. 9E) to determine the content of the message. A message command to reset causes operation to return to START point 250. If the message is a command to activate data output as determined at block 307, silent mode is disabled at block 308 in favor of an active data mode. Operation then proceeds through point 310 to block 311 (FIG. 9M) to respond to the controller or host computer that the order is implemented. The cycle then proceeds through point 296 to block 295 (FIG. 9C) to transmit the data and return to the beginning of operation at block 252.

If the message was determined at block 307 (FIG. 9E) to be other than a command to activate data output, operation proceeds through point 315 to block 316 (FIG. 9F) to determine if the message is a command for data in raw or compensated form. If so, the ordered data mode is set at block 317, a response is made through point 310 and block 311 that the command has been implemented and operation returns through point 296 to block 295.

If the message was not a data form command as determined at block 316, operation proceeds through point 319 to a series of inquiries to determine whether or not the message is one containing compensation data, such as algorithm compensation constants, to be stored in memory. At block 322 (FIG. 9G), a determination is made as to whether or not the message includes temperature compensation data. If not, operation proceeds through point 323 to, in sequence, block 326 (FIG. 9H) to determine if the data is creep compensation data, point 327 and block 329 (FIG. 9J) to determine if the data is linearity compensation data, and point 330 and block 331 (FIG. 9K) to determine if the data is span trim calibration data. If the message is determined to contain one of the types of compensation data, operation proceeds through point 333 to block 335 (FIG. 9G) where the data is stored in memory. A check is then made at block 336 to determine if the data load was successful. If so, operation proceeds through point 310 to block 311 to respond that the message command has been implemented and then through point 296 to block 295. If the data load was not successful, a response to that effect is sent at block 338 and operation proceeds through point 296 to block 295.

It should be noted that compensation constants for correcting for temperature, creep, linearity, and span trim calibration are transmitted to the digital load cell only during set up as part of the manufacturing process. Accordingly, results of the tests described above for the presence of such data in a received message would be negative when the load cell is operating as a part of the scale system of FIGS. 6 and 7.

Referring again to FIGS. 9A to 9M, when the received message has undergone the last test for containing of data constants at block 331 (FIG. 9K), operation proceeds through point 340 to block 341 (FIG. 9L) for a determination as to whether the message includes an address assignment for the load cell. If not, operation proceeds through point 296 to block 295. If the message is an address assignment the address is stored in memory at block 343 and a check made at block 344 to determine if loading of the address was accomplished satisfactorily. When the address load was not satisfactory a response to that effect is sent at block 345 and operation proceeds through point 296 to block 295. If the address was loaded successfully as determined at block 344, operation proceeds through point 310 to block 311 (FIG. 9M) for transmission of a response that the command has been implemented. Operation then proceeds through point 296 to block 295.

Figure 10A:
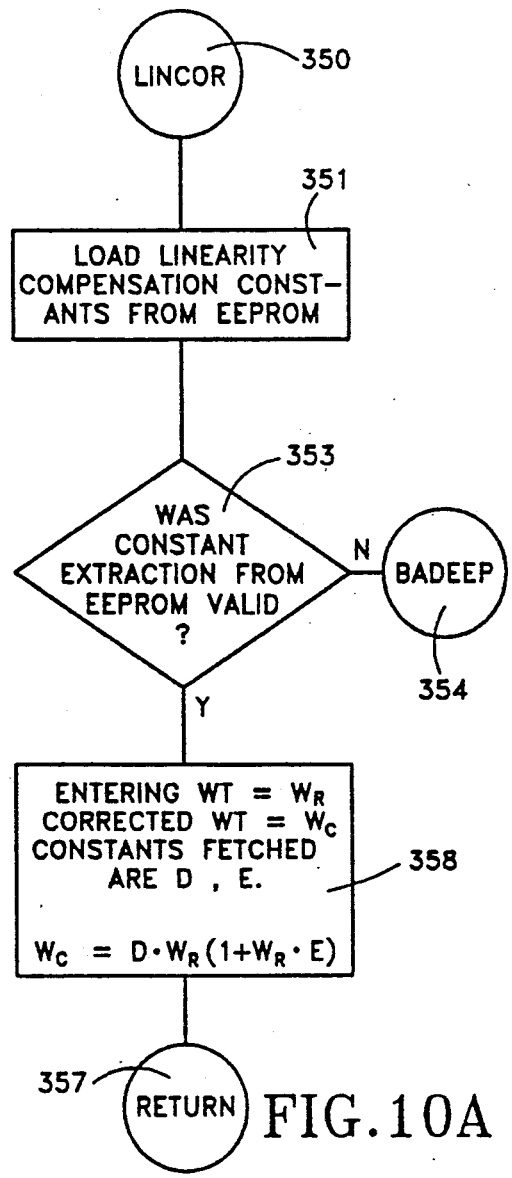
FIGS. 10A and 10B are a flow chart illustrating a linearity compensation procedure employed in the digital load cell.
Figure 10B:
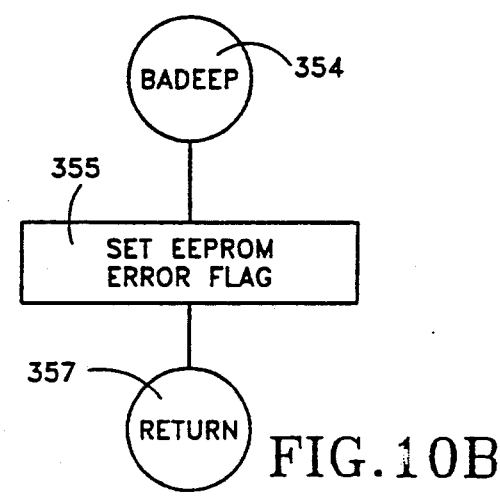

FIGS. 10A and 10B illustrate the steps in subroutine LINCOR performed at block 276 (FIG. 9B) for providing a linearity correction to the weight reading. The subroutine is entered at point 350 (FIG. 10A) and proceeds to block 351 where the linearity compensation constants D and E are loaded. Operation then proceeds to block 353 where a check is made to determine if the constants were loaded correctly. If not, operation proceeds through point 354 to block 355 (FIG. 10B) where an error flag is set and operation returns through point 357 to the main program at block 277. If the linearity compensation constants were loaded satisfactorily as determined at block 353, operation proceeds to block 358 where a linearity-corrected weight reading is calculated and stored. Operation then returns through point 357 to block 277 in the main program.

The flow chart of FIGS. 11A to 11L illustrates the operation of the master controller 130 in the scale of FIGS. 6 and 7. After power up at block 400 and some initializing steps at block 401 the number of load cells in the system is extracted from memory at block 403 and the information checked at block 405. If the number of load cells has not been entered and the cells identified set up mode will be selected at block 406 and operation will jump through point 407 to decision block 410 (FIG. 11B) to check for keyboard activity. If there is keyboard activity and the system is in set up mode as determined at block 412 operation jumps through point 413 to decision block 415 (FIG. 11C) to determine if the number of load cells and their addresses are known. Since they are not, operation proceeds to decision point 417 to determine if the keyboard indicates single/total key activity. If so, operation jumps through point 418 to blocks 420 and 421 (FIG. 11D) where an appropriate display is ordered and a single cell flag set or cleared according to whether one or more load cells are in the system. Operation then jumps back through point 423 to blocks 425 and 426 (FIG. 11C) where the number of load cells is entered and addresses assigned to them. The load cell addresses are assigned by connecting only the first load cell to the bus, addressing it as number 240 which is assigned to all load cells at manufacture and then instructing it to change that address to the newly assigned address. The second load cell in the system is then connected to the bus and the procedure repeated This continues until all load cells have been connected to the bus and assigned addresses.

From block 426 operation proceeds through point 430 to blocks 432 and 433 (FIG. 11E) where a reset command is sent to all load cells followed by an order to supply data when polled If any cell does not respond positively as determined at block 435 the address of the highest ranking non-responsive cell is displayed at block 436 to enable operator intervention, if necessary. Operation then jumps through point 423 to blocks 425 and 426 (FIG. 11C) where load cell addresses are again assigned and then returns through point 430 to blocks 432, 433 and 435. Operation proceeds around this loop until all load cells in the system have responded positively as determined at decision block 435.

From decision point 435, operation proceeds through point 440 to decision block 442 (FIG. 11F) to determine if the system has exited set up mode. If not operation jumps through point 445 to block 446 (FIG. 11G) to begin checking for the activation of one or more of a series of keys which command various set up functions. If a key command is detected at decision block 446 to reassign a load cell address, operation jumps through point 448 to the procedure illustrated in FIGS. 12A and 12B which will be described below. Reassignment of a load cell address may become necessary when, for example, a single load cell in the system of FIGS. 6 and 7 has been determined to be defective and must be replaced In that case, a new load cell must be assigned the same address as that of the load cell replaced.

At the end of the load cell address reassignment procedure operation returns through point 440 (FIG. 11F) to decision block 442 to determine whether or not the set up mode has yet been exited. If not, operation proceeds through point 445 to resume scanning for key commands. If, at decision block 453 (FIG. 11G), a key command has been received to calibrate the scale operation jumps through point 455 to that procedure. When the calibration operation is completed operation returns through point 440 to decision block 442 (FIG. 11F) and through point 445 to resume scanning for key commands Operation continues in this manner through decision blocks 457, 459 and 461. A shift adjust key command at block 457 initiates through point 463 a procedure for determining the values of load position correction constants. A key command detected at block 459 initiates a calibration trim procedure through point 465. A key command at block 461 causes operation to jump through point 467 to a procedure for load position adjustment of a scale after replacement of a load cell.

Figure 11A:
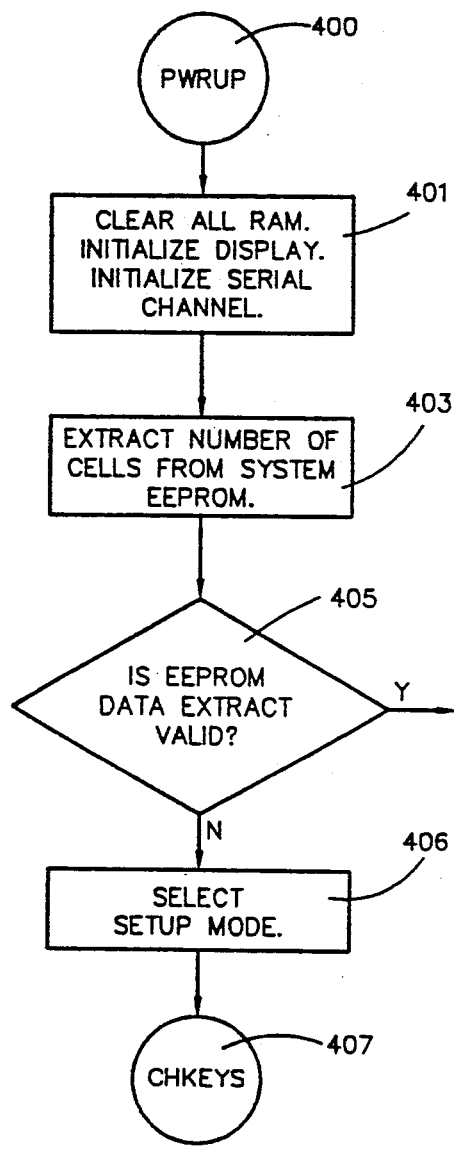
Figure 11B:
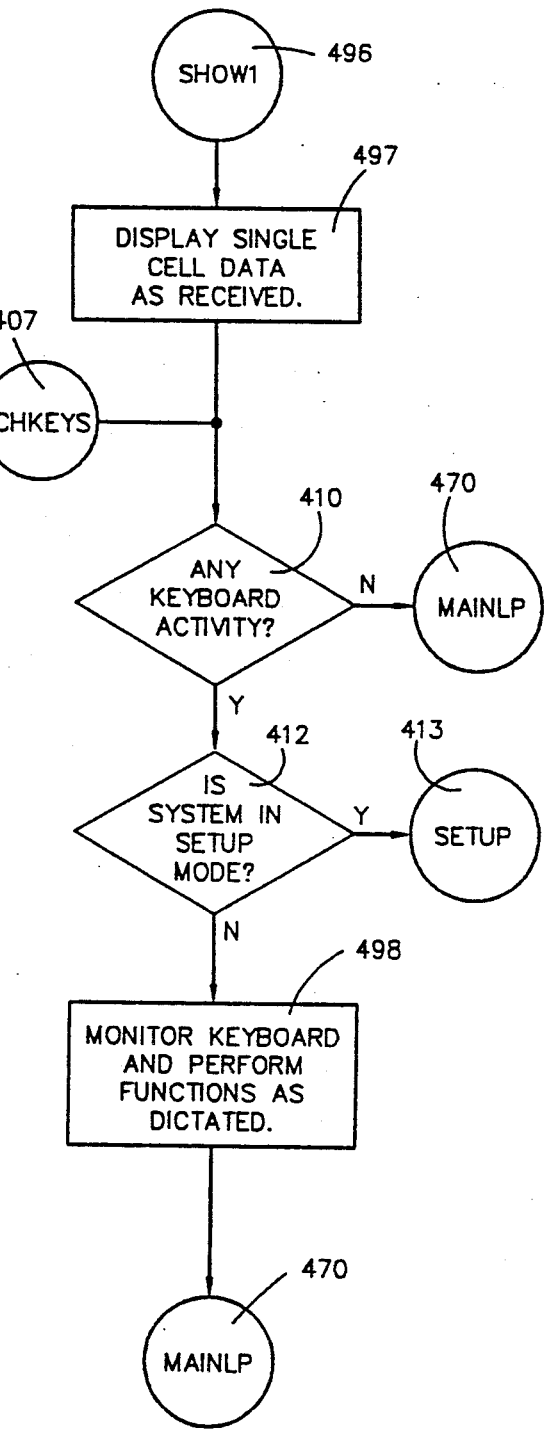
Figures 11C, 11D:
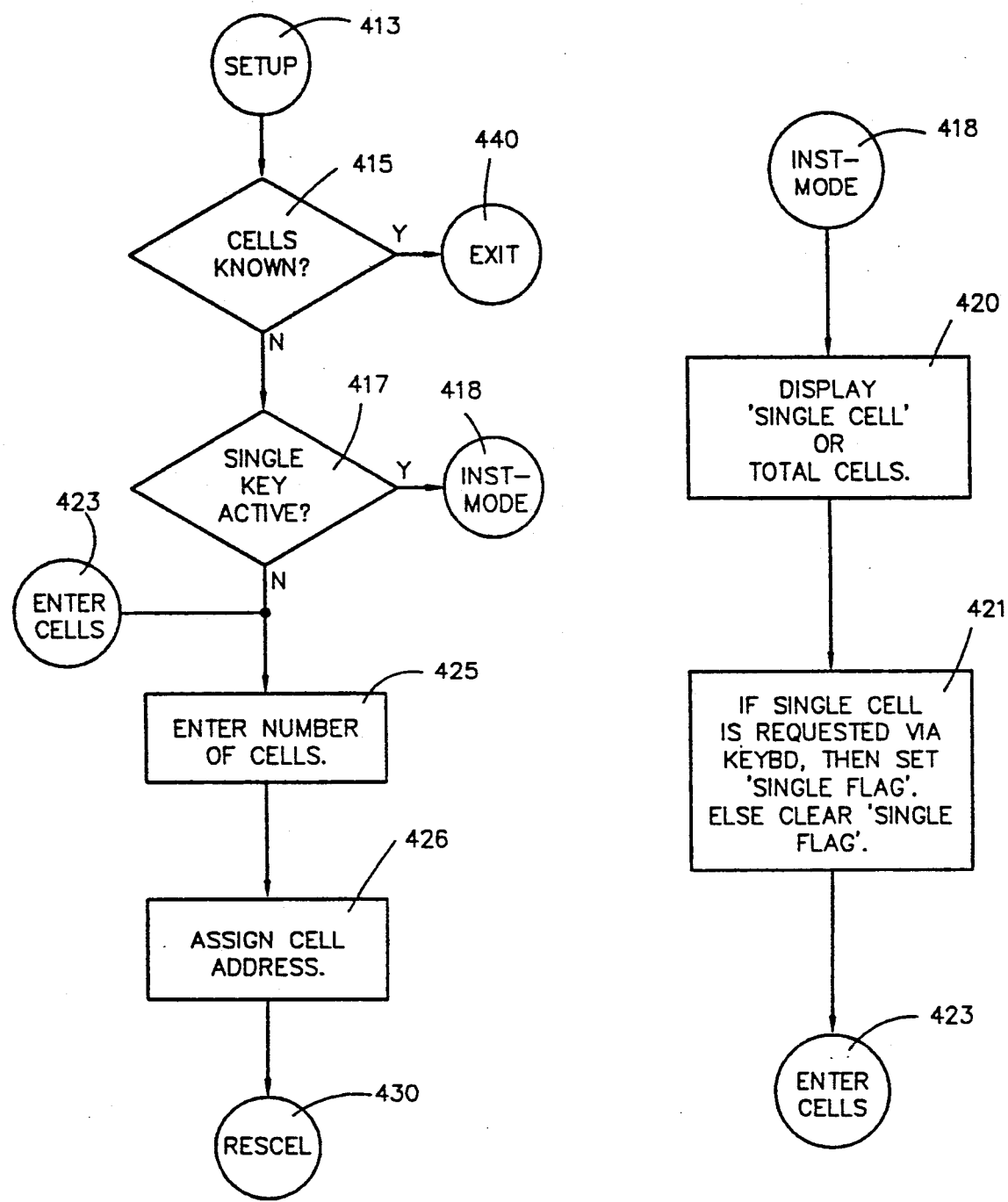
Figure 11G:
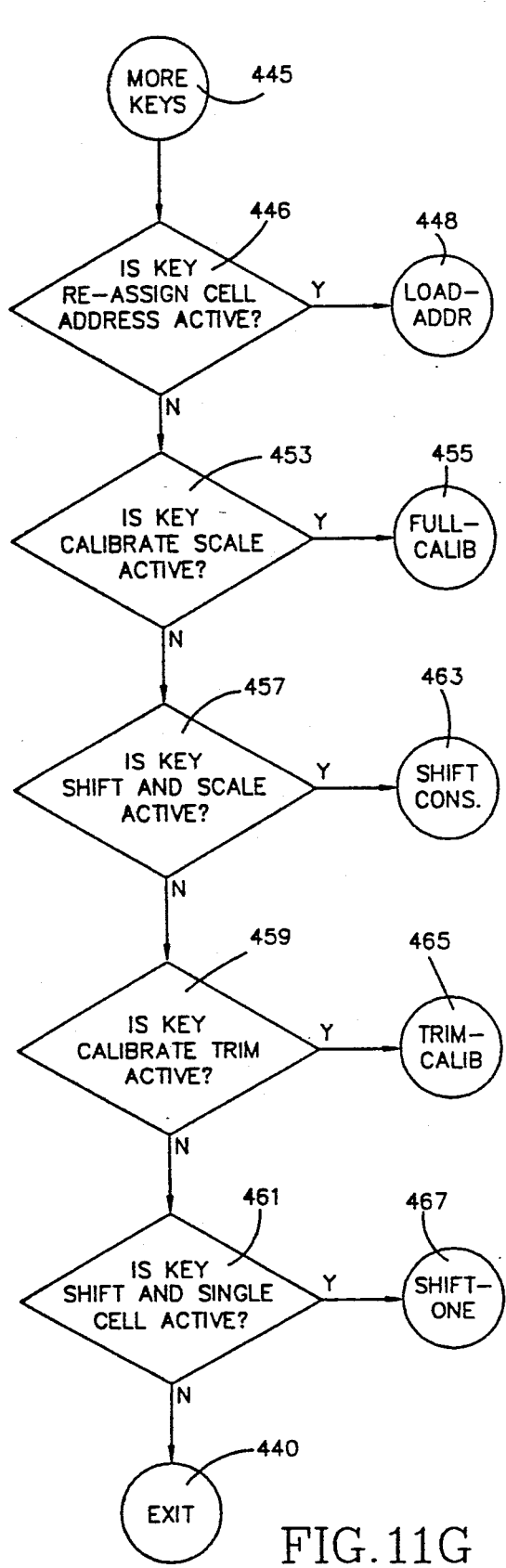
Figure 11H:
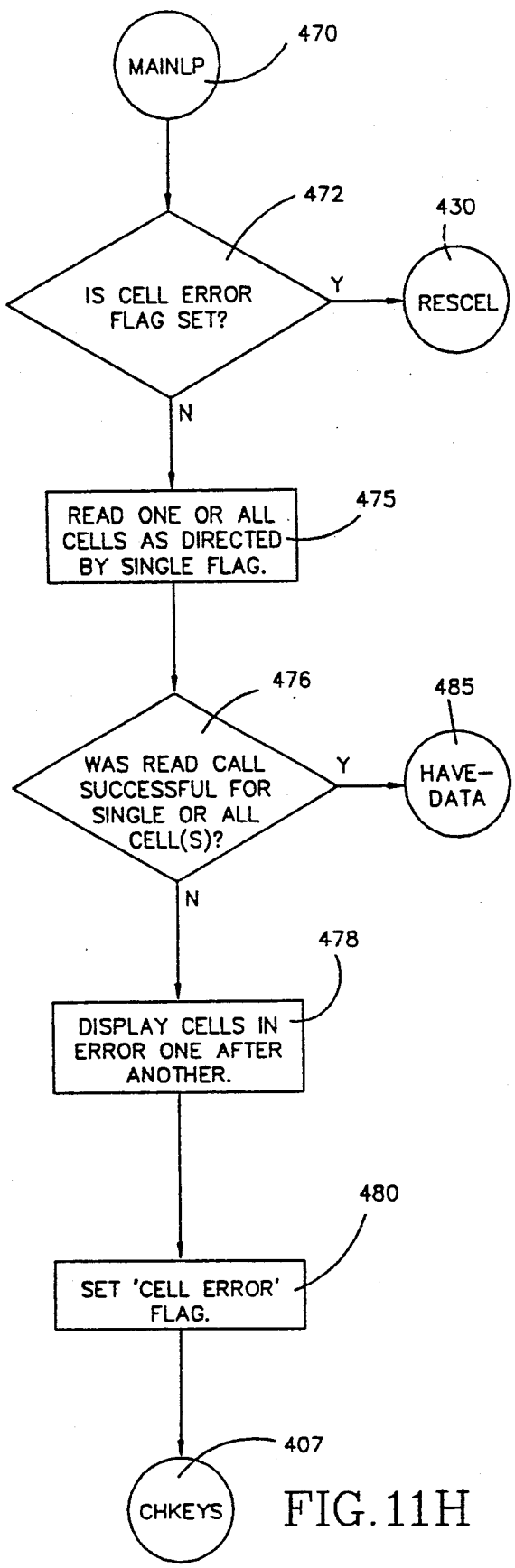
Figure 11J:
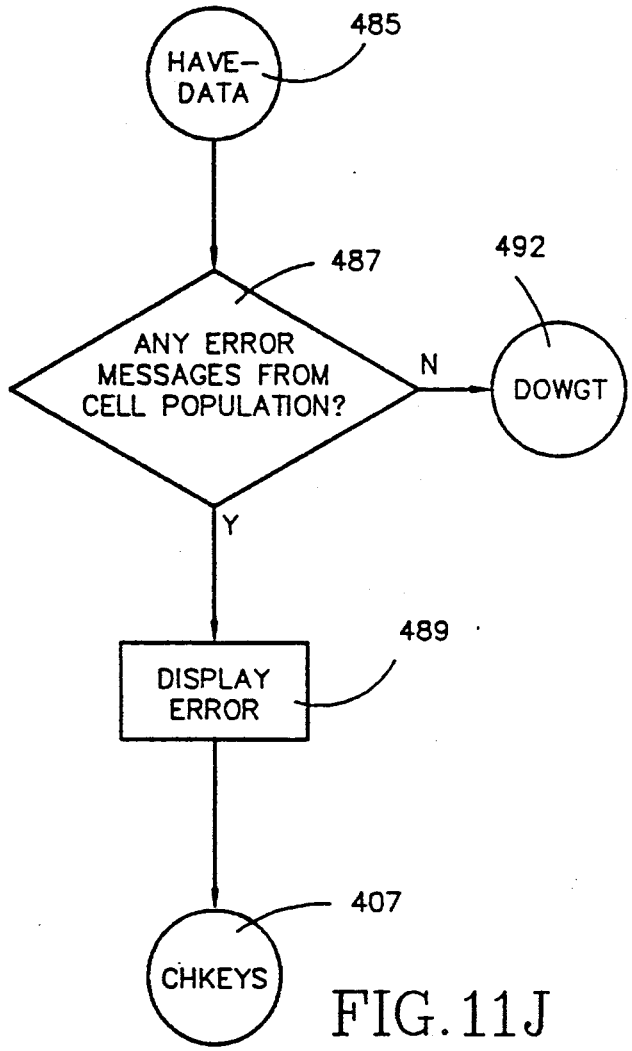
Figure 11L:
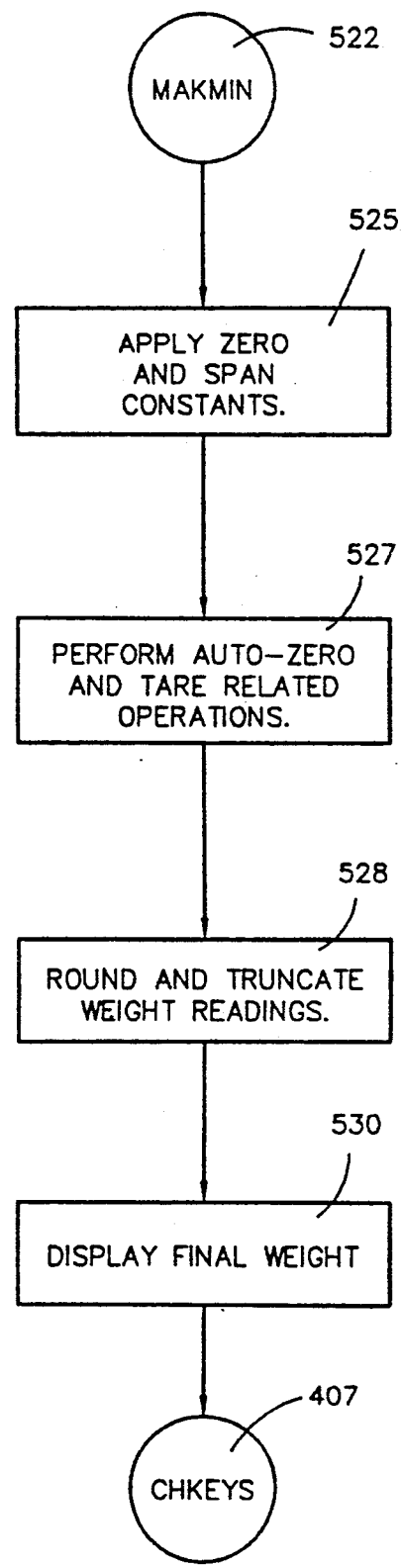

When all key commands have been satisfied operation proceeds through point 440 to block 442 (FIG. 11F). When set up mode has been exited operation proceeds through point 470 to decision block 472 (FIG. 11H). If no load cell error flag has been set, readings are taken from all of the load cells at block 475 and a check made at block 476 to determine if data was received from all cells. If not, the addresses of the load cells in error are displayed at block 478 and a cell error flag set at block 480. Operation then jumps through point 407 to decision block 410 (FIG. 11B) and if there is no keyboard activity returns through point 470 to decision block 472. Since the cell error flag has been set, operation proceeds through point 430 to blocks 432 and 433 (FIG. 11E) where the load cells are reset and reordered to supply data. If all cells do not respond positively as determined at block 435, operation proceeds through block 436 and point 423 to blocks 425 and 426 (FIG. 11C) to again assign load cell addresses and then returns through point 430 until, as determined at block 435 (FIG. 11E), all cells respond positively. Operation then proceeds through point 440 and decision block 442 (FIG. 11F) and through point 470 and block 472 (FIG. 11H) to again read all cells at block 475.

Figure 11K:
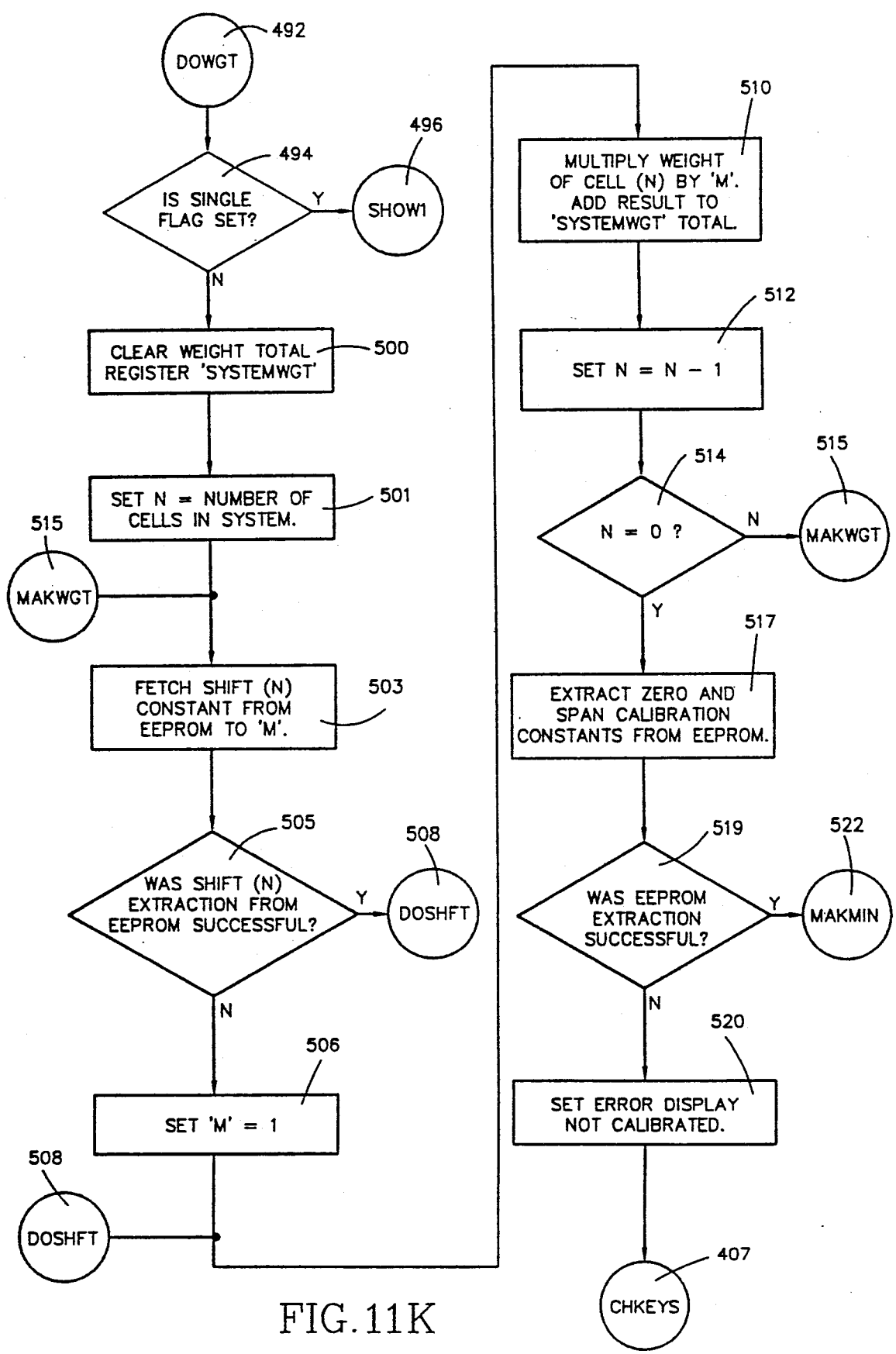

When, as determined at block 476, data is obtained from all load cells operation proceeds through point 485 to decision block 487 (FIG. 11J) to check for any error messages received with the load cell data. If any such error messages are received the fact is displayed at block 489 and operation proceeds through point 407 to block 410 (FIG. 11B). If there is no keyboard activity operation returns through point 470 to again read data at block 475 (FIG. 11H) from all the load cells. When a determination is made at block 487 (FIG. 11J) that no error messages have been received with the data, operation proceeds through point 492 to decision block 494 (FIG. 11K). If, as determined at block 494, the single cell flag is set operation jumps through point 496 to block 497 (FIG. 11B) where the single load cell data is displayed. Operation then returns to point 470 (FIG. 11H) through block 410 alone or through blocks 412 and 498.

If, as determined at block 494 (FIG. 11K), the single cell flag is not set operation is begun at block 500 to adjust the weight readings from the load cells for load position and to sum the readings to obtain the total weight on the scale. At block 500 the total weight register is cleared and at block 501 a register is set to N, the number of load cells in the system. The load position correction constant X for the highest numbered load cell in the system is fetched from memory at block 503 and loaded into register M. If the fetching of the load position constant X for load cell N was not successful as determined at block 505, the numeral 1 is loaded into register M at block 506 and operation continues. If the load position constant was successfully fetched from memory as determined at block 505 operation jumps through point 508 to block 510 where the weight reading from load cell N is multiplied by load position constant $X_N$ stored in register M and the result added to the total weight register Then, at block 512, N is decremented and tested at block 514 to determine if it is equal to zero. If not, operation returns through point 515 to block 503 where the shift adjust constant X for the next highest numbered load cell in the system is fetched from memory and loaded into register M.

Operation proceeds in the same manner as described above until the weight readings from all of the load cells have been multiplied by the respective load position correction constants and summed in the total weight register. At that point, block 514 will determine that the readings from all load cells have been summed. The zero and span calibration constants will then be fetched from memory at block 517. If the memory fetch was not successful as determined at block 519 an error display will be made at block 520 and operation will return through point 407 to block 410 (FIG. 11B). If the memory fetch was successful operation proceeds through point 522 to block 525 (FIG. 11L) where the zero and span constants are applied to the weight reading. Then, at block 527, other operations are performed relating to auto-zero and tare. At block 528 the weight reading is rounded and truncated for display and at block 530 the final weight is displayed. Operation then returns through point 407 to block 410 (FIG. 11B) to check for keyboard activity and poll the load cells for weight readings.

Returning to FIG. 11A and decision block 405, the above description assumed that addresses had not yet been assigned to the load cells in the system. If, however, addresses had previously been assigned as determined at block 405 operation would proceed through point 535 to block 540 where preparations would be made for polling the load cells. Operation would then proceed as described above with reset commands being sent to all load cells at block 432.

An important advantage of the present invention is the ability to replace one or more defective load cells in a multiple load cell scale. Since each load cell in a scale can be monitored and diagnosed individually a defective load cell can be easily found. When that happens, a new load cell is inserted into the system to replace the defective one and an address is assigned to the new load cell.

Figures 12A, 12B:
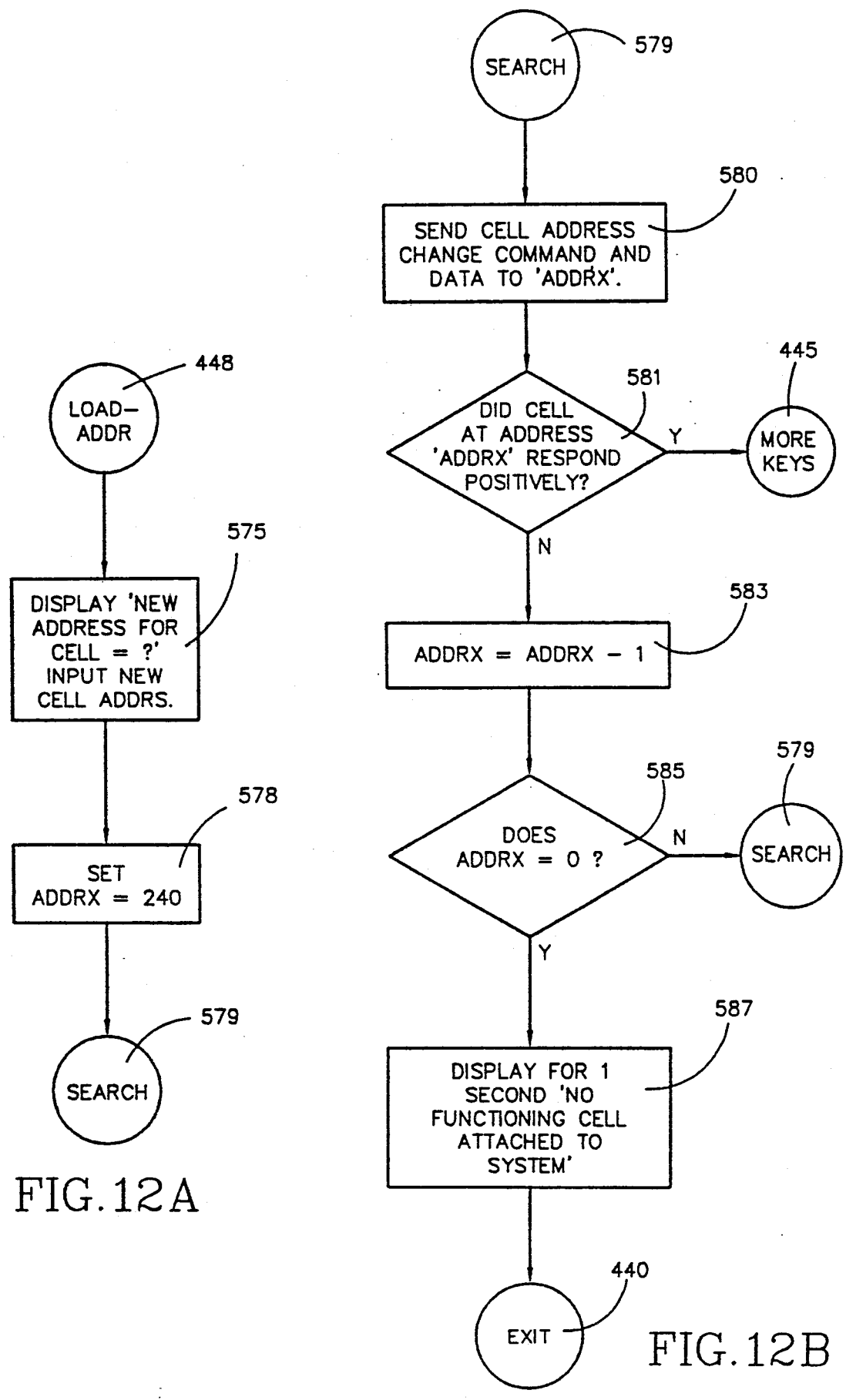
FIGS. 12A and 12B are a flow chart illustrating the procedure for assigning an address to a replacement load cell in a multi-load cell system.

FIGS. 12A and 12B illustrate the procedure for assigning the address to the new load cell. The procedure is entered through point 448 when a key command to reassign a load cell address has been detected at block 446 (FIG. 11G). Initially, all of the other load cells in the scale system must be disconnected from the bus so that only the new load cell is connected thereto. Referring to FIG. 12A, the new load cell address, which in this case would be the same as that of the removed defective load cell, is entered through the keyboard at block 575 in response to a prompting message from the display At block 578 an address of 240 is loaded into an address register and operation proceeds through point 579 to block 580. There, a load cell address change command and the new address are transmitted to the load cell address, in this case 240, in the address register Then, at block 581 a determination is made as to whether or not a positive response was obtained from the addressed load cell. If so, the new address has been satisfactorily assigned and operation returns through point 445 to scanning the keyboard at block 446 (FIG. 11G). This would normally be the result when the replacement load cell is a new load cell since address 240 is loaded into all load cells at manufacture.

In some cases, however, the replacement load cell would not be a new load cell and could have a stored address other than 240 In that case, operation would proceed from decision block 581 to block 583 where the contents of the address register are decremented and then, at block 585, compared to zero. If the contents of the address register are not equal to zero operation returns through point 579 to transmit the address change command and new address to the decremented load cell address and then check at block 581 for a positive response. Operation proceeds in this manner until a positive response is obtained from the replacement load cell or until the contents of the address register have been determined to be equal to zero at block 585. In that case the display is caused at block 587 to indicate that no functioning load cell is attached to the system and operation returns through point 440 to block 442 (FIG. 11F).

Figure 13:
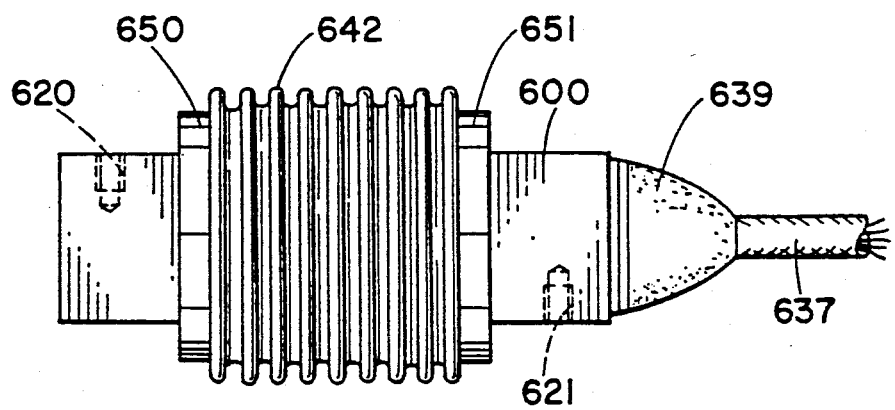
FIG. 13 is a side view of another modular digital load cell embodying the present invention.
Figure 14:
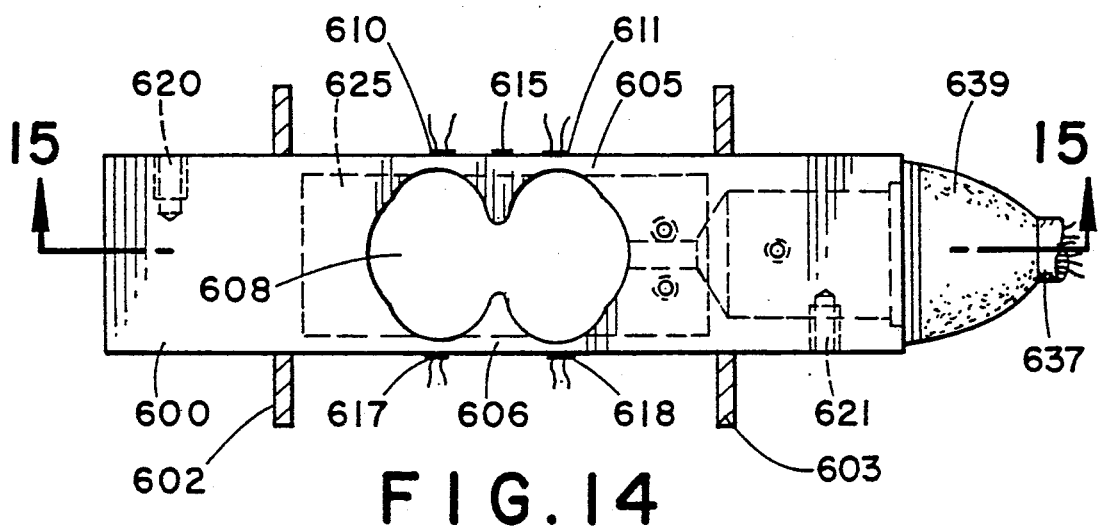
FIG. 14 is a side view, partly in section and to a larger scale, of the counterforce of the load cell of FIG. 13.
Figure 15:
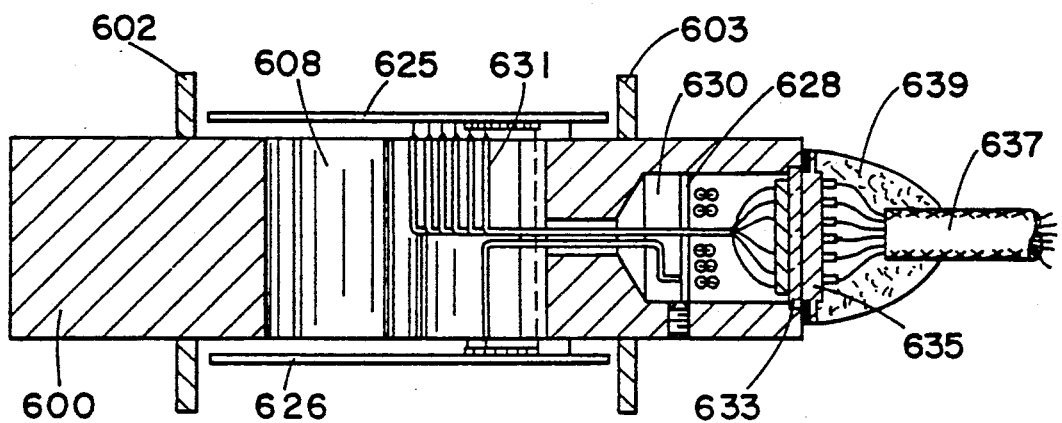
FIG. 15 is a horizontal sectional view of the load cell of FIG. 14 on the line 15—15.

FIGS. 13-15 and FIGS. 16 and 17 illustrate additional examples of modular digital load cells embodying this invention. In FIGS. 13-15, a double guided beam counterforce 600 and two enclosure rings 602, 603 are cast in stainless steel. An upper beam 605 and a lower beam 606 are defined by a plurality of holes drilled through the stainless steel block to form the opening 608 A pair of strain gages 610, 611 are mounted on the upper beam 605 aligned along its center line in the conventional manner. A nickel resistor 615 is positioned between the gages and used for temperature sensing. Another pair of strain gages 617, 618 is mounted in the same fashion on lower beam 606. Pairs of tapped holes at 620, 621 are provided for mounting the counterforce to a load receiver at one end and a base at the other end.

As shown in FIG. 15, printed circuit boards 625, 626 are mounted on the sides of counterforce 600 and another circuit board 628 is mounted within a cavity 630 formed in one end of the counterforce The circuit boards contain the analog and digital circuits required to make the load cell perform in a manner similar to the load cell of FIGS. 1 to 4 Suitable wiring is provided among the circuit boards and strain gages and to a connector 633 at the open end of cavity 630. A glass and metal seal 635 is soldered to counterforce 600 to close the open end of cavity 630. Seal 635 carries wiring terminals for mating with the wiring of connector 633. Wiring from the terminals of seal 635 is routed to a cable 637. Seal 635, the wiring and the end of cable 637 are enclosed by an epoxy seal 639.

Printed circuit boards 625 and 626 along with the strain gage bearing portions of the dual beam counterforce 600 are enclosed and sealed by means of a tubular bellows 642. Bellows 642 is fitted over one end of counterforce 600 and positioned between rings 602 and 603. Bellows 642 is attached to rings 602 and 603 by welding the outer periphery of each ring to the inner periphery of the ends 650, 651 of the bellows 642.

The electronic circuits and the non load-contacting portions of the load cell of FIGS. 13-15 are thus enclosed and sealed. The result is a self-contained, modular digital load cell which can and must be adjusted, compensated and further characterized only through cable 637, as in the digital load cell of FIGS. 1-4.

The basic load cell shown in FIGS. 16 and 17 is known as a torsion ring load cell. The counterforce generally indicated as 675 is formed of stainless steel and includes an outer ring 677 and a central hub 679 connected by an inner tapered diaphragm 680 and an outer tapered diaphragm 681 to a torsion ring 684. In use, the outer rim is usually held stationary by bolts or the like and the load or force applied to hub 679. This loading produces circumferentially directed compressive strain on the upper portion of the torsion ring 684 and circumferentially directed tensile strain on the lower portion of the torsion ring. Four strain gages 687-690 are spaced at 90° intervals on the upper surface of torsion ring 684 with their strain sensing elements oriented circumferentially to sense compressive strains produced in the ring. Likewise, four strain gages, only two being shown and identified as 692 and 693, are mounted on the lower surface of torsion ring 684 directly below the compression gages to sense tensile strains in the torsion ring. The strain gages are preferably connected in an electrical bridge circuit. Two holes 694a, 694b are provided through outer diaphragm 681 for passage of wiring from strain gages 687-690 to the cavity below torsion ring 684. A loading hole 695 is provided in hub 679 to facilitate the application of loads to the load cell.

According to the present invention, an annular circuit board 700 is fitted over the lower portion of hub 679 and secured thereto by glue or other suitable attaching means. Circuit board 700 contains the analog and digital electronic circuits required to make the load cell perform in a manner similar to the load cell of FIGS. 1-4. A cable nipple 701 is provided through an opening in outer rim 677 for transmission of information between the digital load cell and a controller or computer. The cavities above and below torsion ring 684 are closed and sealed by means of annular metal seals 704 and 705, such as stainless steel foil, welded or otherwise suitably attached to the inner periphery of outer rim 677 and the outer periphery of hub 679. If desired, the cavities above and below torsion ring 684 may be filled with an inert gas. The load cell is another modular, self-contained digital load cell which can and must be characterized and controlled only through cable nipple 701.

What is claimed is:

1. Weighing apparatus comprising a counterforce, transducer means mounted on said counterforce, circuit means associated with said counterforce, said circuit means being responsive to external control and including means for producing digital representations of loads applied to said counterforce, (means for storing said digital representations, and means responsive to external commands for transmitting said digital representations from storage,) means providing a sealed enclosure for said transducer means and said circuit means, and means providing a path through said enclosure means for external communication with said circuit means.

2. Weighing apparatus as claimed in claim 1 wherein said circuit means includes means responsive to external commands for storing an externally assigned address.

3. Weighing apparatus comprising a plurality of load cells, each load cell including a counterforce, transducer means mounted on said counterforce, circuit means associated with said counterforce, said circuit means including means for producing digital representations of loads applied to said counterforce, (means for storing said digital representations, and means responsive to external commands for transmitting said digital representations from storage, means providing a sealed enclosure for said transducer means and said circuit means, and means providing a path through said enclosure means for external communication with said circuit means, load receiving means supported by said load cells, means connecting said load cells in series, means for interrogating said load cells to receive said digital representations form storage, and means for combining said digital representations to produce digital representations of the total weight on said load receiving means.

4. Weighing apparatus as claimed in claim 3 wherein each of said circuit means includes means for storing an externally assigned address.

5. A method of weighing comprising the steps of providing a plurality of load cells, each load cell including a counterforce, transducer means mounted on the counterforce and circuit means associated with the counterforce for providing digital representations of loads applied to the counterforce, providing a sealed enclosure for said transducer means and said circuit means, providing a path through the enclosure for external communication with said circuit means, connecting the load cells in series, assigning each of said load cells a unique address from a remote source, storing said digital representations in each of said load cells, addressing said load cells to receive said digital representations from storage, and combining said digital representations to produce digital representations of the total weight on said load cells.

* * * * *